United States Patent [19]

Uchinono et al.

[11] Patent Number: 5,238,614
[45] Date of Patent: Aug. 24, 1993

[54] PROCESS OF FABRICATING THREE-DIMENSIONAL OBJECTS FROM A LIGHT CURABLE RESIN LIQUID

[75] Inventors: Yoshiyuki Uchinono, Yawata; Yoshikazu Higashi, Kadoma; Takeshi Ikemura, Shijonawate; Yoshimitsu Nakamura, Settsu, all of Japan

[73] Assignee: Matsushita Electric Words, Ltd., Japan, Osaka, Japan

[21] Appl. No.: 878,997

[22] Filed: May 6, 1992

[30] Foreign Application Priority Data

May 28, 1991 [JP] Japan ............... 3-124079
Oct. 28, 1991 [JP] Japan ............... 3-281748

[51] Int. Cl.$^5$ ................ B29C 35/08; B29C 41/02
[52] U.S. Cl. ..................... 264/22; 118/423; 118/429; 118/620; 156/273.5; 156/275.5; 250/432 R; 250/492.1; 425/174.4; 427/595
[58] Field of Search ............ 264/22, 23, 25, 69, 264/255; 427/595; 118/423, 429, 620; 156/273.5, 275.5; 250/432 R, 492.1; 430/270; 425/174, 174.4

[56] References Cited

U.S. PATENT DOCUMENTS

| 5,071,337 | 12/1991 | Heller et al. ............ 425/174.4 |
| 5,139,711 | 8/1992 | Nakamura et al. ........ 425/174.4 |
| 5,143,663 | 9/1992 | Leyden et al. ........... 425/174.4 |

FOREIGN PATENT DOCUMENTS 61-114817 6/1986 Japan .
63-141724 6/1988 Japan .
91/12120 8/1991 PCT Int'l Appl. ......... 425/174.4

Primary Examiner—Jill L. Heitbrink
Attorney, Agent, or Firm—Stevens, Davis, Miller & Mosher

[57] ABSTRACT

A process of fabricating a three-dimensional object from a light curable liquid resin by radiating a light to a surface of the liquid resin to form successive cross-sectional layers of the cured resin superimposed on each other. The process makes it possible to rapidly form on a platform or on a previously cured layer a fresh stratum of a desired thickness to be subsequently cured into the corresponding layer. The process utilizes a vessel containing a volume of the liquid resin and a platform carrying the layers, and comprises the steps of a) forming the stratum of the liquid resin on an overlay surface of the platform or previously cured layer outside of the liquid resin in the vessel; b) immersing the resulting stratum into the liquid resin in the vessel to place a top surface of the stratum approximately in level with a liquid level of the vessel, thereby surrounding a periphery of the stratum by the liquid resin in the vessel; c) allowing a portion of the liquid resin surrounding the stratum to flow toward the periphery of the stratum such that the stratum has a continuous flush top surface over substantially the entire of the overlay surface; and d) radiating the light to the stratum so as to cure it into the cross sectional cured layer. At the step c), only a minimum amount of the resin is caused to flow into the stratum from the surrounding resin and therefore expedite to the formation of the stratum into a straight configuration.

14 Claims, 23 Drawing Sheets

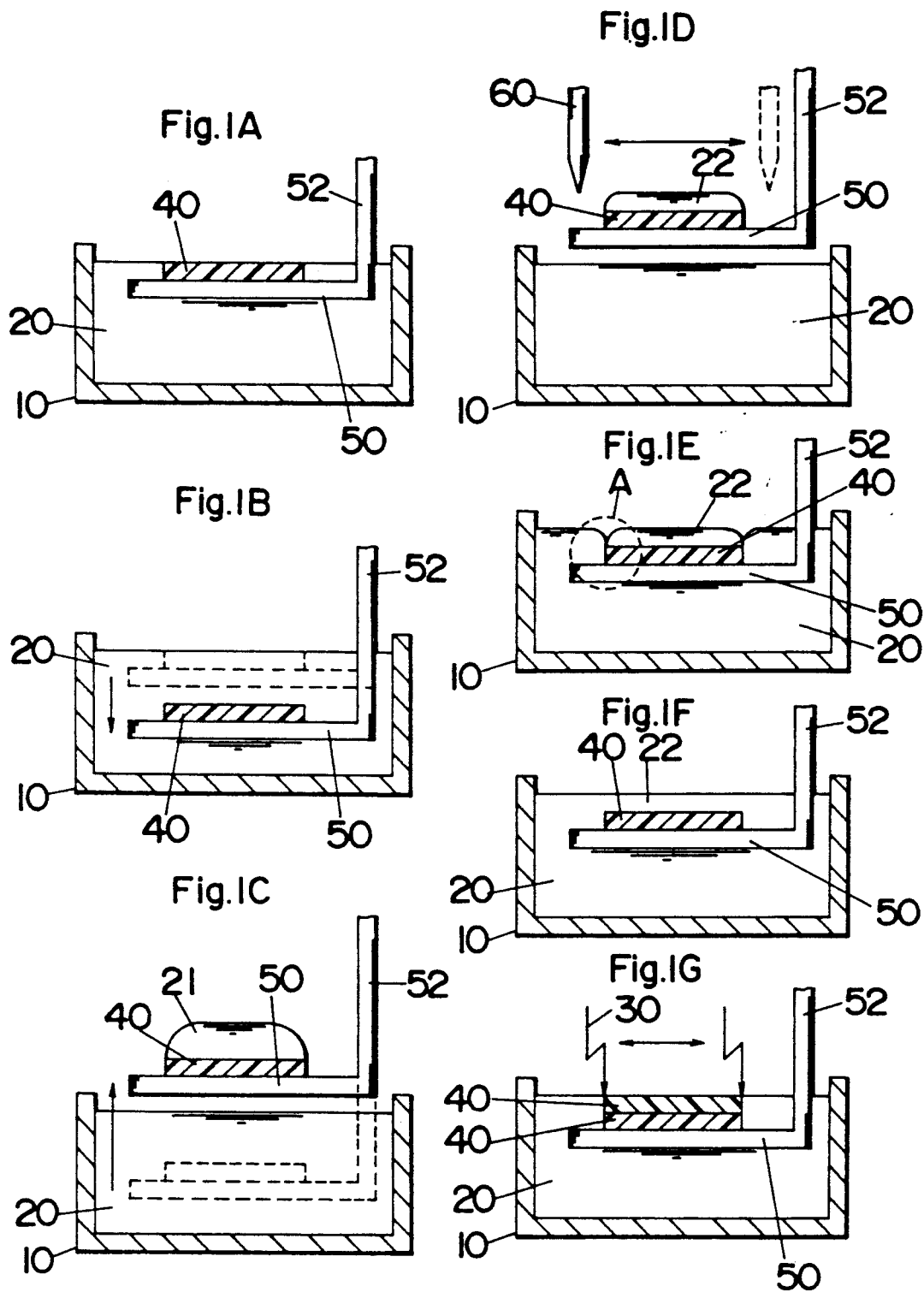

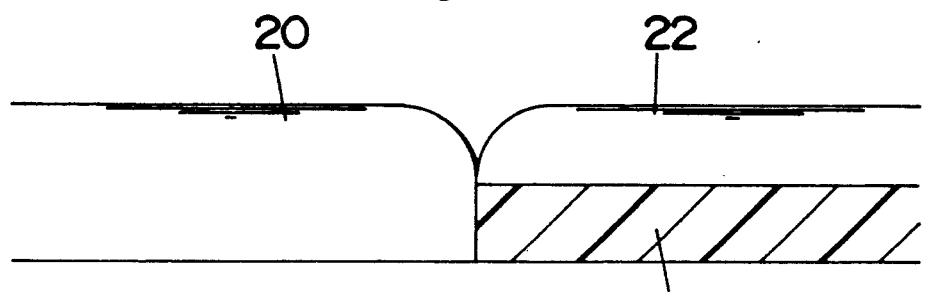
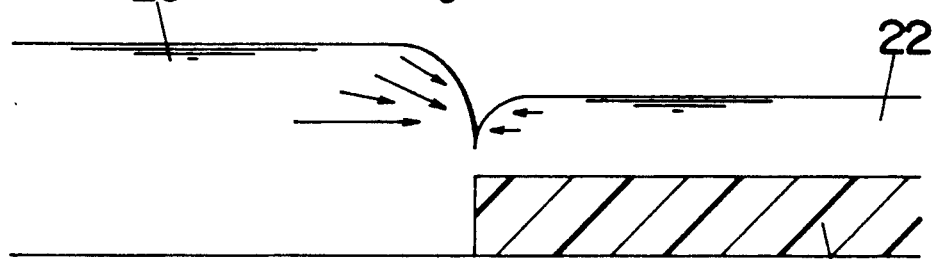
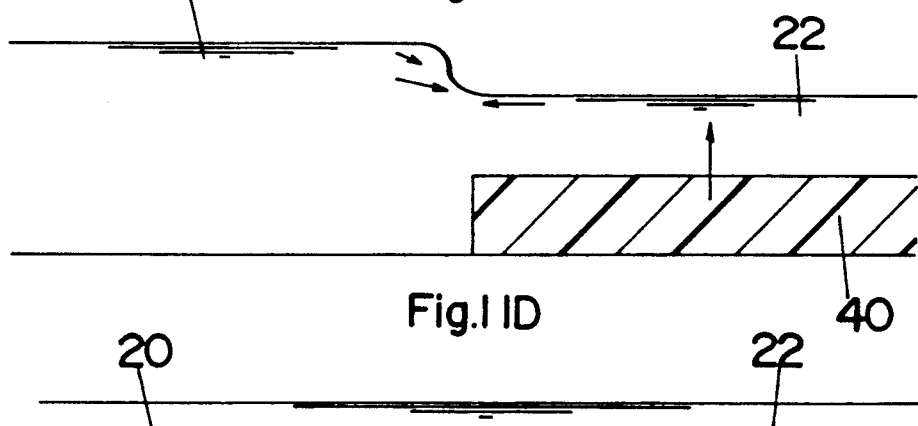
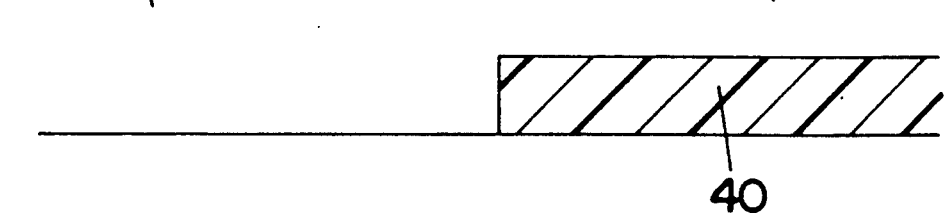

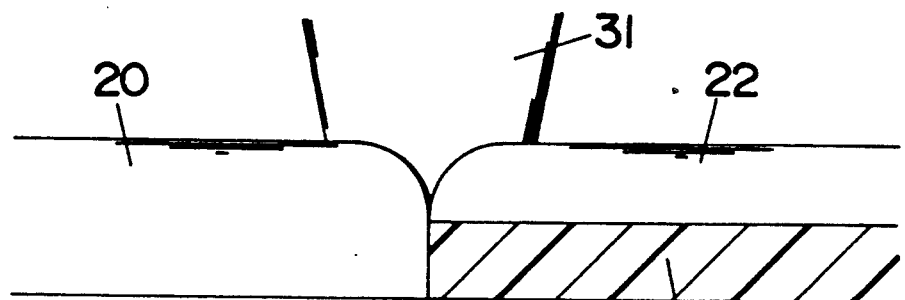
Fig.12A
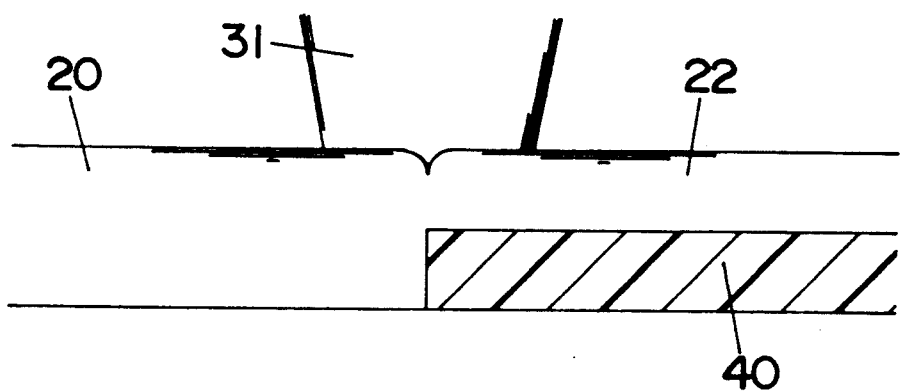
Fig.12B
Fig.12C
Fig.12D
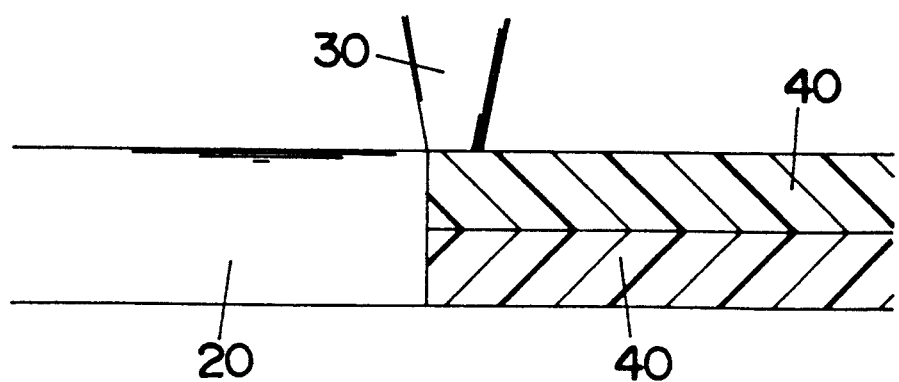

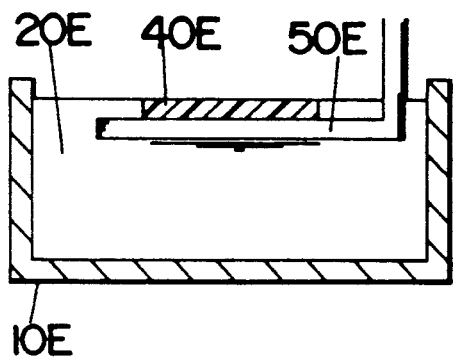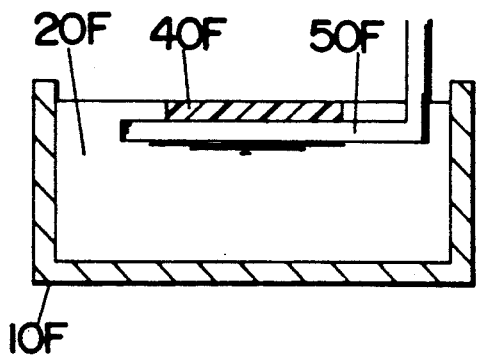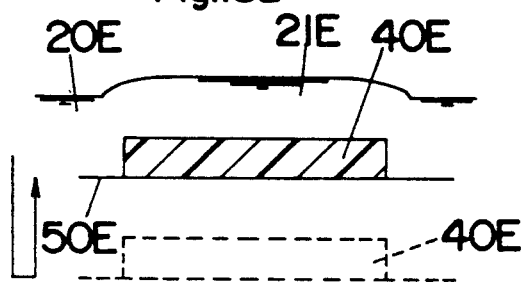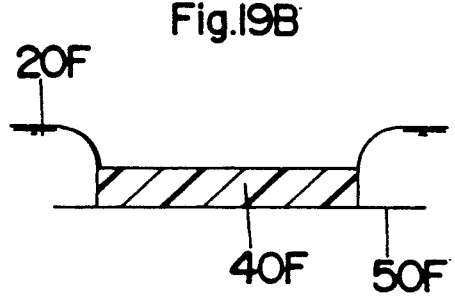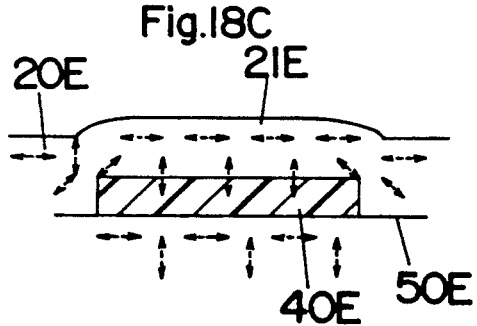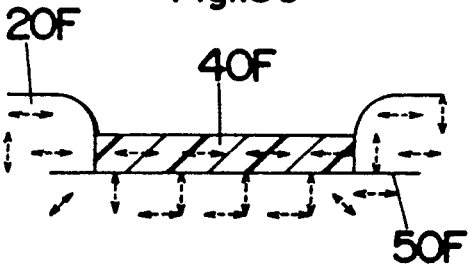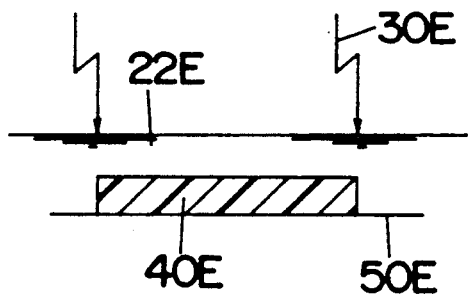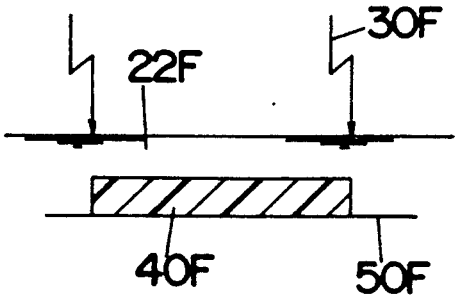

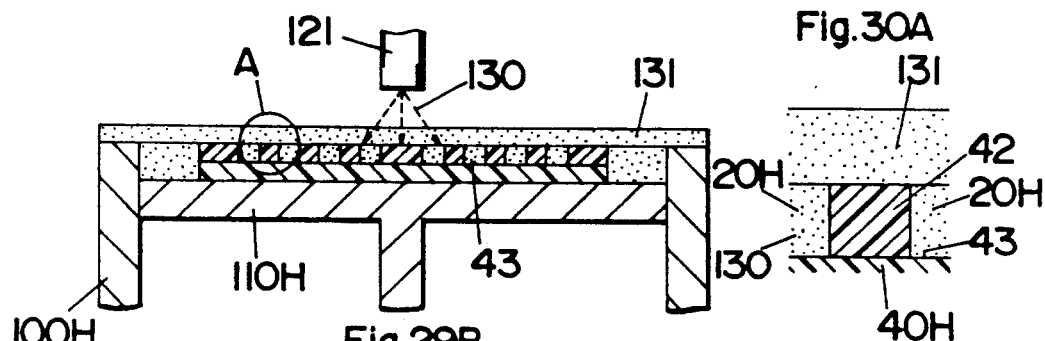
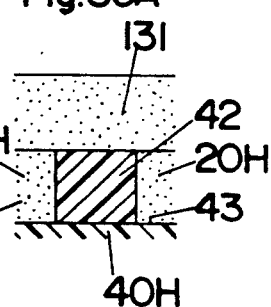
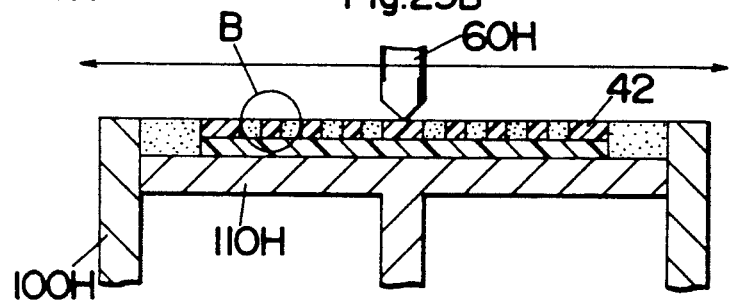
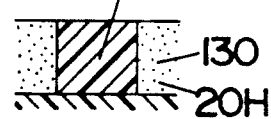
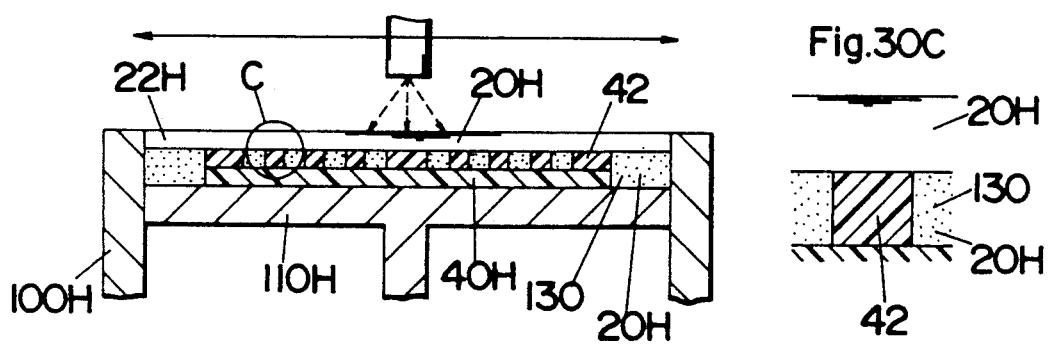
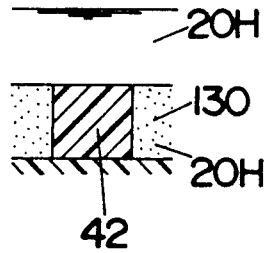
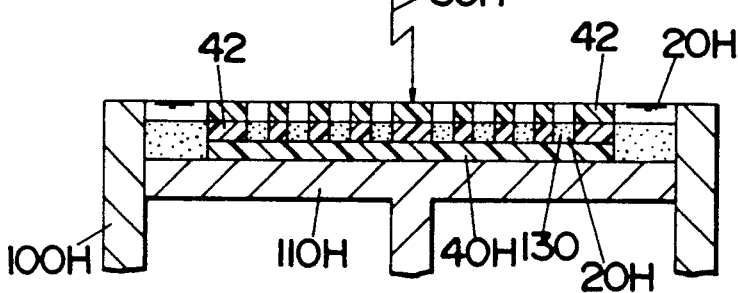

PROCESS OF FABRICATING THREE-DIMENSIONAL OBJECTS FROM A LIGHT CURABLE RESIN LIQUID

BACKGROUND OF THE INVENTION

1. Field of the Invention

The present invention is directed to a process of fabricating a three-dimensional object from a light curable resin liquid, and more particularly to an improvement in such process for fabricating the three-dimensional object with an increased fabrication rate and accuracy.

2. Description of the Prior Art

Such three-dimensional object forming process from a light curable resin has been proposed in the art to be advantageous in fabricating a small quantity of product models or prototypes without relying upon molds or machining tools, as disclosed in Japanese Patent Early Publication [Kokai] Nos. 61-114817, and 63-141724. A process of Publication No. 61-114817 comprises to supply a light curable liquid resin into a vessel to form on a vessel bottom a liquid resin coat of a desired thickness. A laser beam is then directed from the above to move across the resulting liquid resin coat in a predetermined pattern to cure it into a correspondingly shaped cross-sectional layer. Subsequently a fresh liquid resin is supplied over the preceding cured layer and is likewise radiated to the laser beam to form another cured cross-sectional layer superimposed on the preceding cured layer. The above steps are repeated to obtain successive cross-sectional layers of cured resin which are superimposed on each other to represent a three-dimensional object of desired configuration. This process, however, poses an inherent problem that it is difficult to control exactly and rapidly the thickness of the liquid resin coat. That is, with this prior art process, the thickness of the liquid resin coat is determined by a amount of the liquid resin supplied into the vessel, but exact control of the supplying amount requires an extremely difficult measure and therefore is not available and practical at the present. Consequently, the prior art process is very likely to suffer from a thickness variation in the coat of the liquid resin and therefore eventually fails to fabricate an accurate three-dimensional object.

On the other hand, the process of another prior art Publication No. 63-141724 is free from the above problem, since it does not require to control the supplying amount of the liquid resin at the time of forming a liquid resin coat to be cured into a cross-sectional layer. As schematically shown in FIG. 32, this prior art process utilizes a vessel 210 containing a volume of the liquid resin 220 and a platform 250 which is vertically movable within the vessel 210. The platform 250 is firstly lowered sufficiently below the liquid level and is then lifted to a position immediately below the liquid level so as to obtain thereon a liquid resin coat 221 of a desired thickness, which is to be formed by exposure to a laser beam 230 into a cured cross-sectional layer 240 on the platform 250. Subsequently, the platform 250 is again immersed together with the preceding Cured layer 240 in the liquid resin 120 and is then lifted to have the top surface of the preceding cured layer 240 positioned immediately below the liquid level so as to form a fresh liquid resin coat 221 to be formed into another cured cross-sectional layer superimposed on the preceding cured layer 240. The steps are repeated to form successive cross-sectional layers 240 of cured resin on the platform 250, thereby fabricating a three-dimensional object of an intended configuration. This process relies upon a phenomenon that a fresh liquid resin supplied over the preceding cured layer 240 or the platform 250 is partially displaced outwardly as the platform 250 moves upwardly while leaving the remainder of the liquid resin remain cohered over the preceding cured layer 240, or the platform 250 due to its high viscosity, thereby providing the liquid resin coat 221 of which thickness T is determined by surface tension, viscosity and specific gravity of the liquid resin as well as interfacial tension between the liquid resin and the preceding layer 240 or the platform 250. Thus, the liquid resin coat 221 can be provided over the preceding cured layer 240 or the platform 250 in a desired thickness without the necessity of controlling the supplying amount of the liquid resin 220. With this process, however, there still remains a problem in that, as typically shown in FIG. 33 (which is a portion A of FIG. 32), when the preceding cured layer 240 is lifted just below the liquid level, the liquid resin lying over the preceding cured layer 240 will not be displaced immediately due to its high viscosity, or it is very reluctant to flow smoothly, thereby leaving a shouldered portion X on the liquid resin coat 221 which portion X is characterized to be raised relative to the surrounding liquid level. Such shouldered portion X can disappear only after an elapse of an extended time and therefore remains during the immediately following laser irradiation so that it is cured into corresponding shape which distorts the resulting layer 240 and fails to present a uniform thickness over the entire area of the cured layer 240. The distortion or uneven thickness in each cured layer will accumulate to cause a critical deformation on the successive layers, or the three-dimensional object. Although, the above problem could be avoided by sufficiently elongating the interval between the formation of the successive cross-sectional layers, this is very time-consuming and does not meet with a practical demand of efficiently fabricating the three-dimensional object. In short, the above process is not suitable to fabricate the three-dimensional object into an accurate configuration at a high production rate.

SUMMARY OF THE INVENTION

The above problems can be eliminated in the present invention which provides an improved process of fabricating a three-dimensional object from a light curable resin at an increased fabrication rate. The process utilizes a vessel containing a volume of the liquid resin and a platform supporting the three-dimensional object being fabricated. At first, a fresh stratum of the liquid resin is formed on the platform and is cured by exposure to a light into a starting layer of the cured resin. Then, another fresh stratum is formed on the starting layer and is likewise cured into corresponding layer which is superimposed on the starting layer. Thereafter, like steps are repeated to superimpose a number of the cured layers on each other to obtain the three-dimensional object. The process in accordance with the present invention is intended to expedite the formation of the fresh stratum on an overlay surface defined as an upper surface of the platform and of the previously cured layer while assuring to give a uniform thickness with a continuous flush top surface to the stratum over the entire area of the above defined overlay surface of the platform or the previously formed cured layer. An improved process of the present invention comprises the steps of:

a) forming the stratum of the liquid resin on the overlay surface of the platform or previously cured layer outside of the liquid resin within the vessel, the resulting stratum having a rounded periphery;

b) immersing the resulting stratum into the liquid resin in the vessel to place a top surface of the stratum approximately in level with a liquid level within the vessel, thereby surrounding the rounded periphery of the stratum by the liquid resin in the vessel;

c) allowing a portion of the liquid resin in the vicinity of the rounded periphery of the stratum to flow toward the rounded periphery in such a manner as to eliminate the rounded periphery and to give a continuous flush top surface to the stratum with a desired thickness extending over substantially the entire of the overlay surface; and d) radiating the light to the stratum so as to cure it into the cross sectional cured layer.

At the step a), the stratum can be quickly formed into a rough configuration but with the rounded or drooped periphery due to the high viscosity of the liquid resin. Thus formed rough stratum can be then immersed without a delay into the liquid resin within the vessel at the step b) in order that the rounded periphery of the stratum is surrounded by the liquid resin. Immediately thereafter, the liquid resin in the vicinity of the periphery of the stratum is allowed at the step c) to flow, joining the liquid resin forming the stratum in a direction of filling a gap left between the rounded periphery and the surrounding liquid resin. This can be done within a relatively short period of time because of that only a minimum flow amount of the resin is necessary to fill the gap, as compared to the prior process in which the entire portion of the stratum is supplied from the surrounding liquid resin. Thus, the stratum can be rapidly smoothed to have a desired thickness extending over substantially the entire overlay surface of the platform or the previously formed cured resin. With this result, it is readily possible to greatly shorten a total time period from forming the rough stratum to smoothening it into a desired straight configuration, whereby greatly expediting the formation of the cross-sectional cured layers accurately into a desired pattern and therefore accurately fabricating the three-dimensional object at an enhanced production rate.

Accordingly, it is a primary object of the present invention to provide an improved process of fabricating a three-dimensional object at an enhanced production rate and into an accurate configuration.

In a preferred embodiment, the rough stratum is formed through the steps of immersing the platform into the volume of the liquid resin in the vessel in such a manner as to position the overlay surface of the platform or the previously formed cured layer to a depth which is greater than a desired thickness of the stratum to be subsequently cured, raising the platform to position the overlay surface above the liquid level of the vessel in order to carry a coat of the liquid resin on the overlay surface, and removing a top portion of the resulting coat of the liquid resin by means of a horizontally movable scraper so as to reform the coat into the stratum. With this method, the rough stratum can be formed in a rapid and convenient manner simply by elevating the platform into and from within the liquid resin of the vessel and operating to move the scraper horizontally.

It is therefore another object of the present invention to provide an improved process which is capable of facilitating the formation of the stratum of the liquid resin to be subsequently cured into the corresponding cross-sectional layer.

In another embodiment, the rough stratum is formed through the steps of supplying the liquid resin above and from other than the liquid resin in the vessel onto overlay surface of the platform or the previously formed cured layer to form thereon a coat of the liquid resin of which thickness is greater than a thickness desired to the stratum, and removing a top portion of the resulting coat of the liquid resin by means of a horizontally movable scraper so as to reform the coat into the stratum. With this method, the rough stratum can be formed rapidly and easily by the use of, for example, a spray head for supplying the liquid resin in combination with the platform and the scraper, but without requiring to get the substantial portion of the stratum from within the vessel. In other words, the platform is not required to be lowered deep into the liquid resin in order to get the liquid resin from within the vessel, which would take a rather long period to flow the liquid resin onto the platform due to the viscous nature of the liquid resin.

It is therefore a further object of the present invention to provide an improved process which is capable of further facilitating the formation of the stratum of the liquid resin on the platform or on the previously formed cured layer.

Preferably, the scraper utilized to remove an excess amount of the liquid resin form the coat is arranged such that the liquid resin adhered to the scraper is cleaned off each time after the scraping is completed. Thus, the successively formed coats can be successfully and constantly scraped into the stratum of a desired thickness, which is therefore a still further object of the present invention.

In a further embodiment, a top-opened self-growing enclosure is utilized to surround the entire circumference of the preceding cured cross-sectional layer in a horizontally spaced relation thereto with a top upper end face of the enclosure is kept at the same horizontal level as that of the preceding cured layer. The enclosure is formed commonly from the liquid resin to have its height increased by an increment of substantially the same thickness as that of the preceding cured layer such that a top end face of the enclosure is maintained at substantially the same horizontal level as a top surface of the preceding cured cross-sectional layer. The liquid resin is supplied over across the preceding cured cross-sectional layer, the enclosure and into a space defined therebetween to thereby leave the stratum of the liquid resin continuously extending horizontally from the top surface of the preceding cured layer to the top end face of the enclosure such that the stratum is of a uniform thickness over an area extending from the top of the preceding cured layer to at least an inner periphery of the top end face of the enclosure. Thus formed stratum is then immersed into the liquid resin in the vessel to place a top surface of the stratum approximately in level with a liquid level within the vessel such that the stratum is surrounded by the liquid resin in the vessel. At this condition, the liquid resin on the preceding cured layer is already of uniform thickness free from any substantial surface irregularity particularly at a portion corresponding to the periphery of the preceding layer. Therefore, the liquid resin on the preceding cured layer can be immediately cured into a desired cross-sectional pattern for further expediting the fabrication of the three-dimensional object. Although there is formed a gap between a rounded or drooped periphery of the stratum present at a portion corresponding to an outer periphery of the preceding enclosure and the surrounding liquid resin in the vessel, such gap can be readily filled in a relatively short time only by a minimum amount of the liquid resin flowing from the surrounding liquid resin, enabling to provide a uniform thickness also on the enclosure within a short time and therefore expedite the formation of the enclosure.

It is therefore a still further object of the present invention to provide an improved process which is capable of further hastening the formation of the stratum of the liquid resin on the previously formed cured layer and therefore the cross-sectional layer as well as the self-growing enclosure.

When immersing the stratum, it is preferred to firstly lower the top surface of the stratum on the platform or the preceding cured layer below the liquid level of the vessel and allowing the surrounding liquid resin to flow over the stratum to a certain extent, and then to raise the stratum to make the top surface thereof in level with the liquid level of the vessel. With this scheme of positively providing a vertical fall between the top surface of the stratum and the surrounding liquid resin, the surrounding resin can be hastened to flow toward the rounded periphery of the stratum, thereby rapidly filling the gap between the rounded periphery of the stratum and the surrounding liquid resin and therefore smoothing the stratum, after which the stratum can be readily formed into a desired thickness simply by being raised to have its top surface in level with the surrounding liquid resin.

It is therefore a still further object of the present invention to provide an improved process which is capable of forming the stratum and therefore the cross-sectional cured layer in a more efficient manner.

For further hastening to smooth the stratum, it is preferred to heat the liquid resin at a boundary between the stratum and the surrounding liquid resin so as to lower the viscosity and expedite the flow of the surround liquid resin toward the stratum. Alternately or in combination with the heating, ultrasonic vibrations or the like minute vibrations may be applied to the liquid resin to expedite the smoothening of the stratum.

When forming the stratum on the overlay surface of the platform or the preceding cured layer within the vessel, it may be effective and time-saving to firstly immerse the overlay surface into the volume of the liquid resin within the vessel to cause a level difference between the overlay surface and the liquid level of the vessel, and immediately thereafter to scrap the surrounding liquid resin to flow over the overlay surface by means of a horizontally movable scraper for smoothening the liquid resin on the overlay surface to form thereon the stratum. The resulting stratum can be immediately cured by exposure to the light into a desired cross-sectional pattern.

It is therefore a still further object of the present invention to provide an improved process which is capable of facilitating the formation of the stratum of the liquid resin within the vessel containing the volume of the liquid resin to be immediately cured into the corresponding cured layer.

The present invention discloses still other advantageous features for fabrication of three-dimensional objects. One of these feature is to use a top-open cylinder and a piston vertically movable therein and having a top surface on which the liquid resin is supplied to form a coat of the liquid resin. A scraper is utilized to sweep over a flat top face of the cylinder in order to scrape a top portion of the coat to thereby smooth it into a stratum of the liquid resin having a uniform thickness over the entire top area of the piston. The resulting stratum is then cured by exposure to the light into a desired cross-sectional layer. In this manner, the curing can be made as soon as the coat is scraped into the resulting stratum, which means that there is no need to wait the self-acting flow of the resin to thereby further increasing the fabrication efficiency.

Another feature is to use a doctor blade of unique configuration as a scraper for successfully scraping the liquid resin to form a resulting stratum of uniform thickness. The doctor blade is configured to have such a scraping edge that is capable of scooping up an extra portion of the liquid resin and preventing a scooped liquid resin from escaping past the scraping edge in a direction opposite to a direction of moving the doctor blade. The scraping edge may be formed on the opposite faces of the doctor blade, and more than two scraping edges may be formed on either face of the blade in a vertically spaced relation to each other.

A further feature is to build up the three-dimensional object from a suitable number of first and second layers. The first layer is formed to have its entire portion cured, while the second layer is partially cured in such a manner as to have a lattice of the cured resin and an uncured liquid resin retained within the lattice. A filler of less shrinkage than the liquid resin is added to the uncured liquid resin of the second layer. Thereafter, an excess amount of the filler is scraped off from the top surface of the cured lattice to smoothen the second layer. Thus formed second layers are superimposed in combination with the first layer or layers into a desired three-dimensional configuration. Finally, the combination of the first and second layers is placed into a curing environment to proceed the curing of the uncured region of the second layer to present the three-dimensional object. With this method of incorporating the filler in the resin, shrinkage of the resin can be reduced sufficiently for accurately fabricating the three-dimensional object.

These and still other objects and advantageous features of the present invention will become more apparent from the following detailed description of the preferred embodiments when taken in conjunction with the attached drawings.

BRIEF DESCRIPTION OF THE DRAWINGS

FIGS. 1A to 1G are schematic views illustrating a process of fabricating a three-dimensional object from a light curable liquid resin in sequence by the use of a vessel containing a volume of the liquid resin and a vertically movable platform in accordance with a first embodiment of the present invention;

FIGS. 5A to 5C;

FIGS. 11A to 11D are schematic views illustrating a modified scheme of forming a stratum of the liquid resin which may be adapted to the above fabricating process;

FIGS. 12A to 12D are schematic views illustrating another modified scheme of forming a stratum of the liquid resin with the aid of a heater which may be adapted to the above fabrication processes;

FIGS. 18A to 18D are schematic views illustrating a process of fabricating a three-dimensional object from a light curable liquid resin in sequence by the use of a vessel containing a volume of the liquid resin and a vertically movable platform in accordance with a sixth embodiment of the present invention;

FIGS. 19A to 19D are schematic views which are similar to FIGS. 18A to 18D but illustrate a modified process of forming a stratum of the liquid resin;

FIGS. 29A to 29D are schematic views illustrating the process of adding a filler into uncured regions of the second layer to subsequently forming another second layer of the lattice structure;

FIGS. 30A to 30C are enlarged sectional views of portions A, B, C indicated respectively in FIGS. 29A to 29C;

DETAILED DESCRIPTION OF THE PREFERRED EMBODIMENTS

First Embodiment <FIGS. 1A to 1G>

Figure 2A:
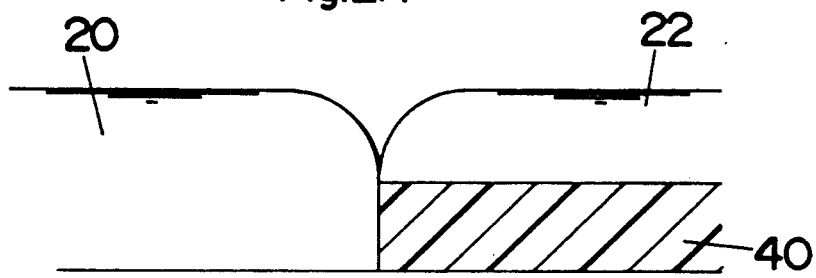
FIGS. 2A to 2D are schematic views illustrating in sequence an effect of smoothening a stratum of the liquid resin attained in the above process.
Figure 2B:
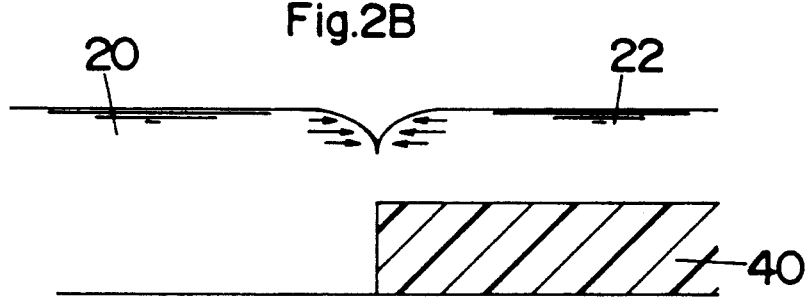
Figure 2C:
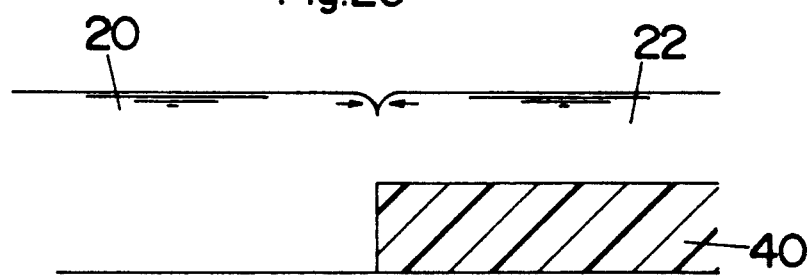
Figure 2D:
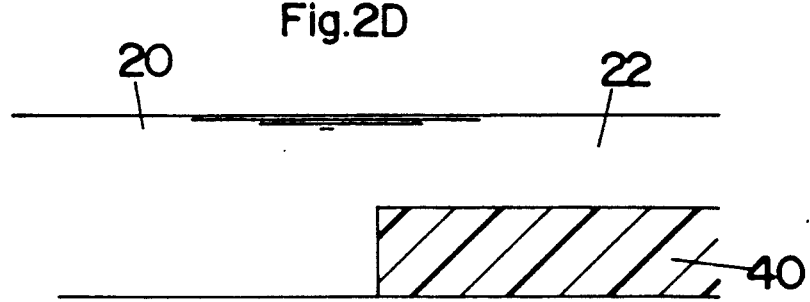

Referring first to FIGS. 1A to 1G, there is shown an improved process of fabricating a three-dimensional object in accordance with a first embodiment of the present invention. The process utilizes a device including a vessel 10 filled with a light curable resin 20, a light beam 30 which is directed to the surface of the liquid resin 20 to form thereat a cured layer 40, and a platform 50 connected to an elevator arm 52 to be vertically movable within the vessel 10. The liquid resin includes an ultraviolet light curable resin such as denatured polyurethanemethacrylate, oligoesteracrylate, urethaneacrylate, epoxyacrylate, photosensitive polyimide, aminoalkyd, or the like generally utilized in the art for the fabrication of proto-types or product models. The light beam 30, for example, He-Cd laser beam is directed from a light source through scan mirrors [not shown] to the surface of the liquid resin 20 so that it can move in X-Y directions to draw any desired two-dimensional pattern or configuration for solidification of the liquid resin into such pattern or configuration.

Initially, the platform 50 is immersed in the volume of the liquid resin 20 in the vessel 10 to form thereon a stratum of the liquid resin which is then cured into a starting or bottom layer of a desired two-dimensional configuration by exposure to the light beam [FIG. 1A]. Subsequently, the platform 50 is lowered to a position of FIG. 1B, to such an extent that the top surface of the cured layer 41 is at a depth which is greater than a desired thickness of a next stratum or layer. Then, the platform 50 is lifted above the liquid level [FIG. 1C], at which condition a major portion of the liquid resin is caused to drop down into the vessel 10 while leaving on the preceding cured layer 40 a small amount of the liquid resin due to viscosity of the liquid resin and interfacial tension acting between the liquid resin and the cured layer 40. Thus, a coat 21 of the liquid resin is kept held on the preceding cured layer 40 to have a thickness which is roughly determined by the viscosity and the interfacial tension but is curved or drooped at its periphery. Immediately thereafter, a scraper 60 is caused to move horizontally to sweep a top portion of the coat 21 to a reduced thickness which is substantially equal to the thickness of a subsequently formed cured layer, thereby preparing a stratum 22 of the liquid resin on the cured layer 40 [FIG. 1D], at which condition, the stratum 22 is still rounded at the periphery. Then, the platform 50 is lowered into the liquid resin in the vessel 10 to an extent such that the top surface of the stratum 22 is kept substantially in level with the liquid resin of the vessel 10, thereby surrounding the rounded periphery of the stratum 22 by the liquid resin 20 in the vessel 10 [FIG. 1F]. In a short time thereafter, the surrounding liquid resin 20 and the portion of the stratum 22 are caused to flow toward the periphery of the stratum 22 in order to fill a gap initially formed between the rounded periphery and the surrounding liquid resin, thereby smoothening the stratum 22 to have a uniform thickness over the entire surface of the cured layer 40 [FIG. 1F]. Thereafter, thus smoothened stratum 22 is likewise cured by exposure to the light beam 30 into a corresponding layer 40 of a desired cross-sectional pattern and superimposed on the preceding cured layer 40. The above steps are repeated to form successively cured cross-sectional layers 40 superimposed to each other into a three-dimensional object of a desired configuration. As shown in FIG. 1E, as a result of immersing the stratum 22 into the liquid resin 20 in the vessel 10, the surrounding liquid resin 20 is temporarily caused by the effect of the surface tension to have a rounded inner periphery which defines the gap with the corresponding outer periphery of the stratum 22. However, because of that the gap is only limited to the periphery of the stratum 22 and therefore occupies a very limited space relative to the overall volume of the stratum 22, only a minimum flow amount of the liquid resin is enough to fill the gap for smoothening the stratum 22 through occurrences, as shown in FIGS. 2A to 2D. Such smoothening can be therefore effected rapidly, which in turn expedite the formation of the cured layers and accordingly the three-dimensional object composed of the cured layers. It is noted in this connection that the filling of the gap is effected by the resin flow not only from the surrounding liquid resin 20 but also from the liquid resin of the stratum 22. Thus, the smoothened stratum 22 can have a thickness which exactly corresponds to a depth of the preceding cured layer 40 as measured from the liquid level of the vessel 10. This can be easily controlled by the vertical movement of the platform 50. That is, the stratum 22 can be finally formed to have a desired thickness from the step of FIG. 1E to the step of FIG. 1F without requiring to strictly determine the thickness of the stratum 22 on the preceding cured layer 40 at the time of scraping step of FIG. 1D with the use of the scraper 60.

Figure 3A:
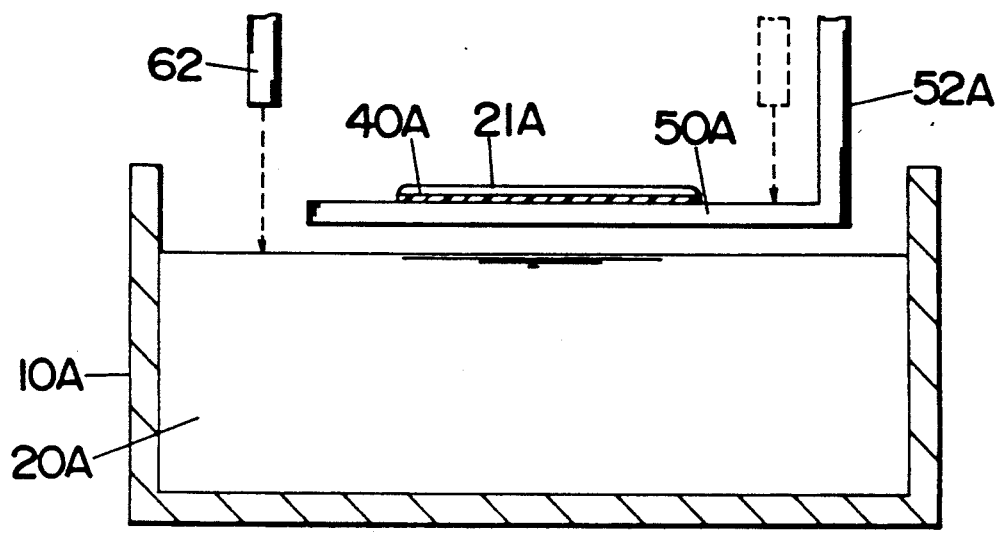
FIGS. 3A and 3B are schematic views as viewed from different directions for illustration of a step of supplying the liquid resin in a process of fabricating a three-dimensional object in accordance with a second embodiment of the present invention.
Figure 3B:
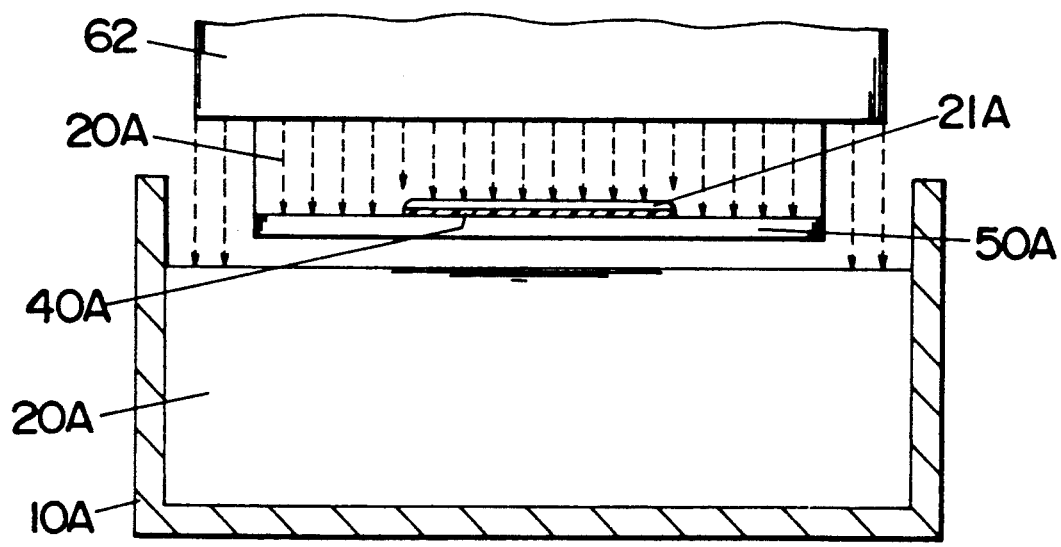

Second Embodiment <FIGS. 3A and 3B>

FIGS. 3A to 3B illustrate another fabrication process in accordance with a second embodiment of the present invention. The process utilizes a spray coater 62 in combination with a like vessel 10A containing a volume of the liquid resin 20. The spray coater 62 is horizontally movable above the liquid level of the vessel 10A for supplying a suitable amount of the liquid resin 20 of the same kind as stored in the vessel 10A onto a platform 50A or a preceding cured layer 40A on the platform 50A. An extra amount of the liquid resin is allowed to flow down into the vessel 10A to thereby leave on the platform 50A or on the preceding cured layer 40A a coat 21A of the liquid resin of which thickness is greater than that of a subsequently formed layer. Immediately thereafter, the resulting coat 21A is thinned by a like scraper utilized in the first embodiment into a corresponding stratum having a thickness nearly equal to the subsequently formed layer. The resulting stratum is then immersed into the liquid resin in the vessel 10A in order have its top surface smoothened in the identical manner as described in the first embodiment with reference to FIGS. 2A to 2D, and is cured by exposure to the light into a corresponding layer of a desired cross-sectional pattern.

It is noted here that during the scraping of the coat into the stratum, the liquid resin is likely to remain adhered to the edge of the scraper and joins readily the stratum of the liquid resin being formed in the next scraping operation to eventually impair the smoothness thereof. To avoid this problem, the scraper is preferred to be cleaned off of any residual liquid resin each time after scraping the coat into the stratum by applying heat or vibration to the scraper for positively flowing the liquid resin out of the scraper or by wiping off the liquid resin by a suitable cleaning member. Heating of the liquid resin may be accomplished by a heater incorporated in the scraper or by a heater-blower generating a hot air directed toward the edge of the scraper. Vibrations of the scraper is preferably of ultrasonic or the like minute vibrations effected by connecting the scraper to a vibration source. Wiping off of the liquid resin is possible by moving the scraper to have its edge in touch with the cleaning member positioned above the liquid level adjacent the scraper. The cleaning member may be of porous material or the like capable of absorbing the liquid resin.

Figure 4:
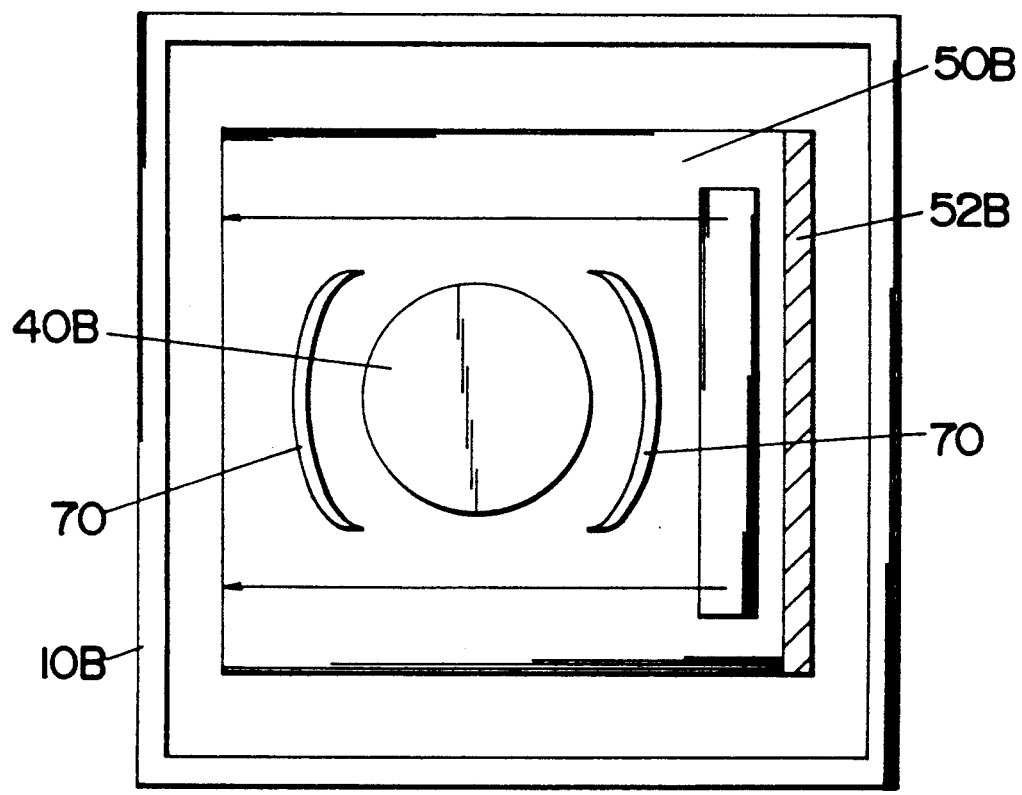
FIG. 4 is a top view illustrating a device for fabricating a three-dimensional object equipped with a scraper for removing an excess amount of the liquid resin and a pair of self-growing dummy walls for removing the liquid resin attached to the scraper in accordance with a third embodiment of the present invention.
Figure 5A:
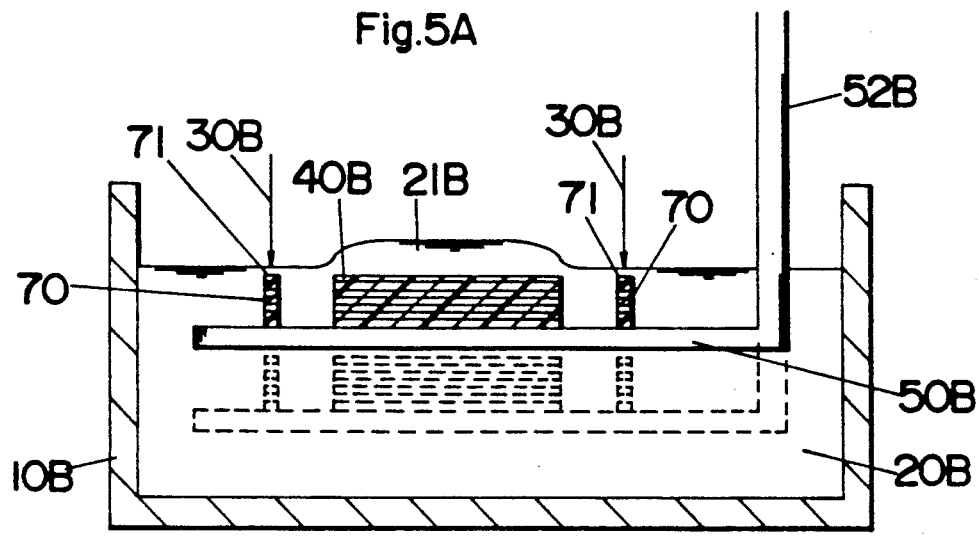
FIGS. 5A to 5C are schematic views illustrating the steps of forming a stratum of the liquid resin on a preceding cured layer in sequence by the use of the device of FIG. 4.
Figure 5B:
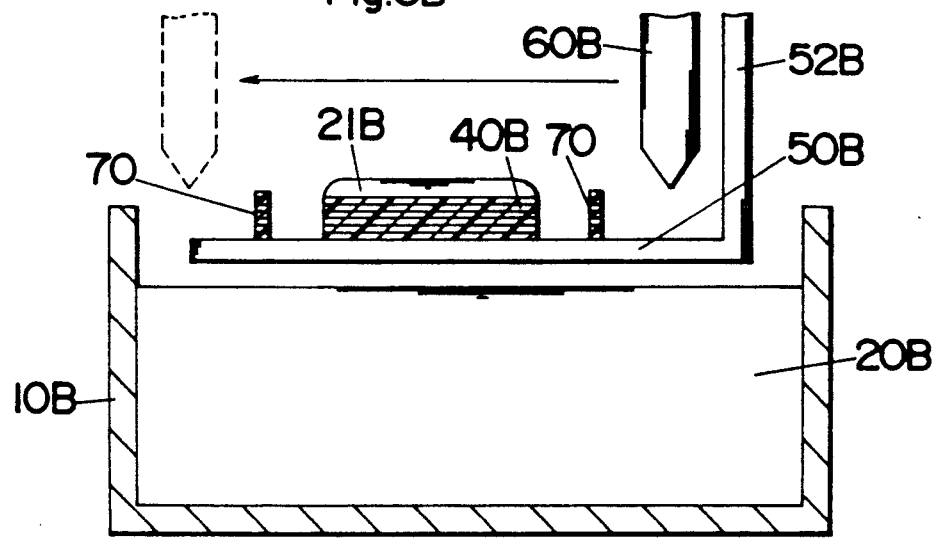
Figure 5C:
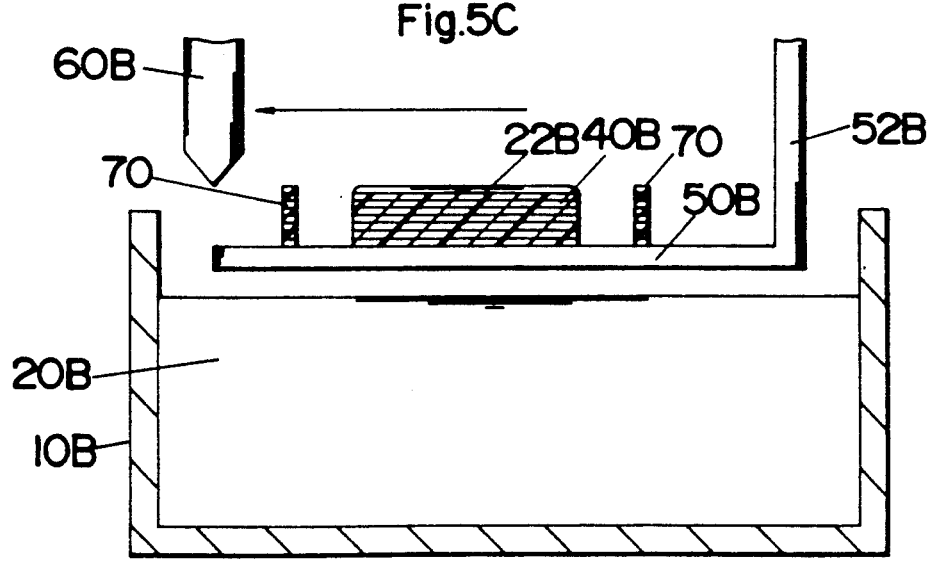
Figure 6:
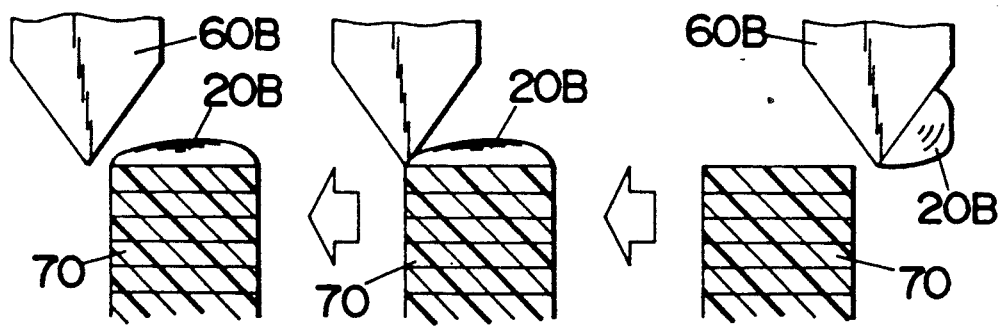
FIG. 6 is a schematic view illustrating a mechanism of removing the liquid resin from the scraper shown in FIGS.
Figure 7:
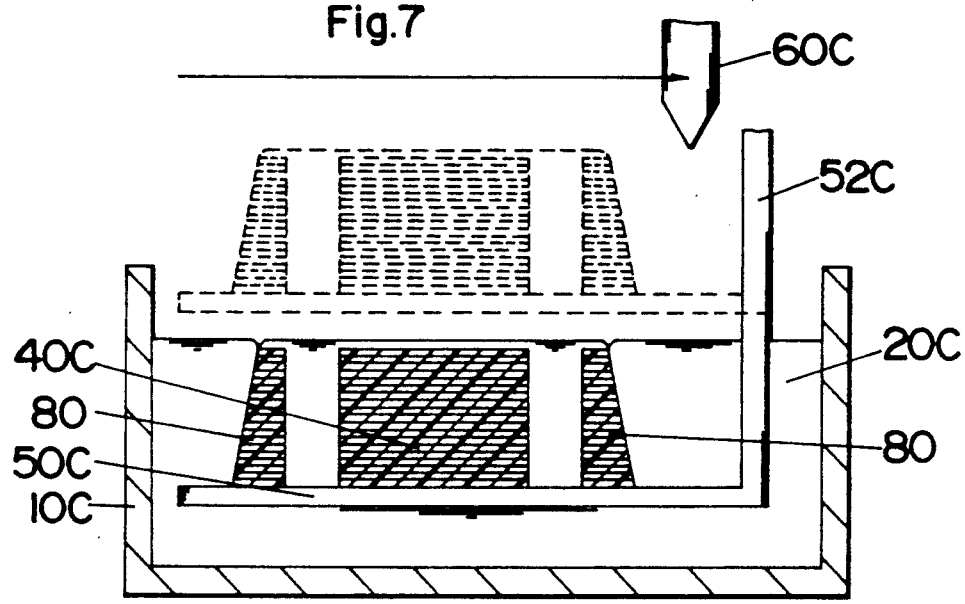
FIG. 7 is a schematic view illustrating a process of fabricating a three-dimensional object in accordance with a fourth embodiment of the present invention.
Figure 8:
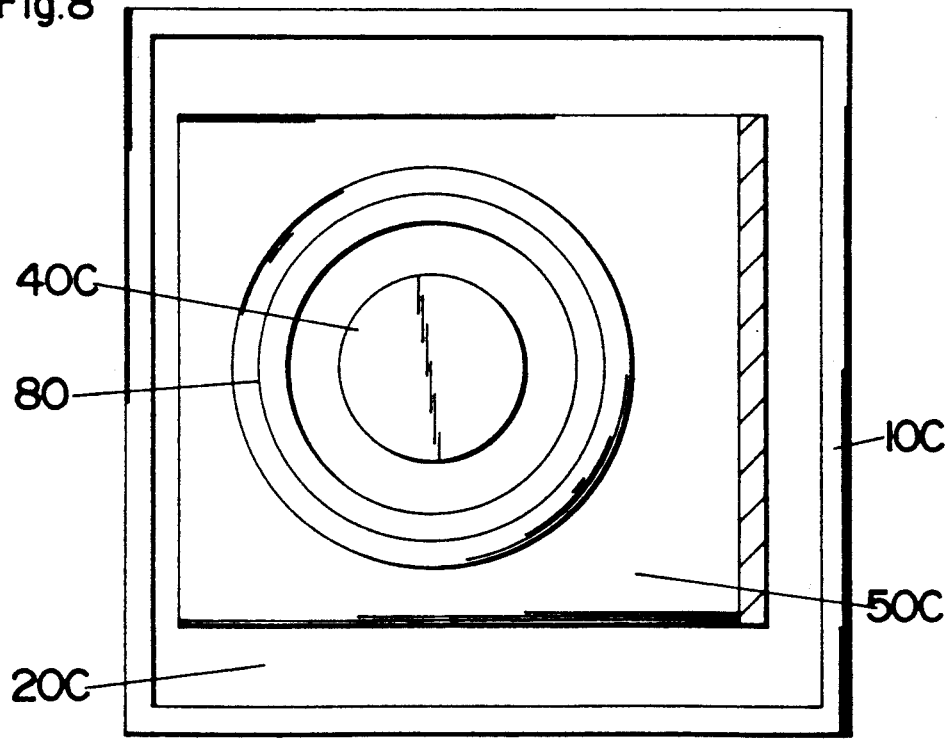
FIG. 8 is a top view of a device utilized for the fabrication process of FIG. 7.

Third embodiment <FIGS. 4 to 6>

A fabrication process in accordance with a third embodiment of the present invention utilizes, in addition to a like vessel 10B containing the liquid resin and a like scraper 60B, a pair of self-growing ledges 70 on a like platform 50B in a spaced relation outwardly of a stack of cured cross-sectional layers 40B. The ledges 70 is cured from the same liquid resin into a reduced width and increases its thickness by an increment of substantially the same thickness as that of the cross-sectional layer 40B. As shown in FIG. 5A, after immersing the platform 50B and the preceding cured layer or layers 40B deep into the vessel, the platform 50B is raised to provide coats 21B and 71 on the preceding cured layer 40 and ledges 70, respectively. Thereafter, the coats 71 is allowed to be rapidly smoothened due to the reduced width of the ledges 70, while the coat 21B is reluctant to be smoothed and remains swelling on the layer 40B. At this condition, the coats 71 are cured by exposure to the light 30B to increment the self-growing ledges 70, while leaving the coat 21B on the layer still uncured. Then, the platform 50B is lifted above the liquid level so as to be reformed into a corresponding stratum 22B of the liquid resin by the operation of a like scraper 60B, as shown in FIG. 5B. In this scraping operation, the scraper 60B comes into an edge contact with the top end of the ledges 70 when passing thereover to be removed of any residual liquid resin adhered on the scraper which would otherwise join the liquid resin on the preceding layer 40 to thereby cause a localized bulge or unevenness. In detail, the liquid resin adhered on the edge of the scraper 60B at the time of previous scraping operation is transferred onto the already formed ledge 70 as the edge of the scraper 60B moves horizontally past over the corresponding ledge 70, as shown in FIG. 6. The resin transferred on the ledge 70 will join in the liquid resin in the vessel 10B in the later step of immersing the platform 50B into the liquid resin of the vessel 10B to form the coat 71 to be subsequently cured. With this result, the liquid resin can be readily and successfully smoothened into the stratum having a uniform thickness over the entire portion except for its periphery, as shown in FIG. 5C. Thereafter, the resulting stratum 22B is immersed back into the vessel 10B and is cured into a corresponding layer of a desired cross-sectional pattern in the identical manner as in the first embodiment.

Fourth Embodiment <FIGS. 7 to 10>

Figure 9A:
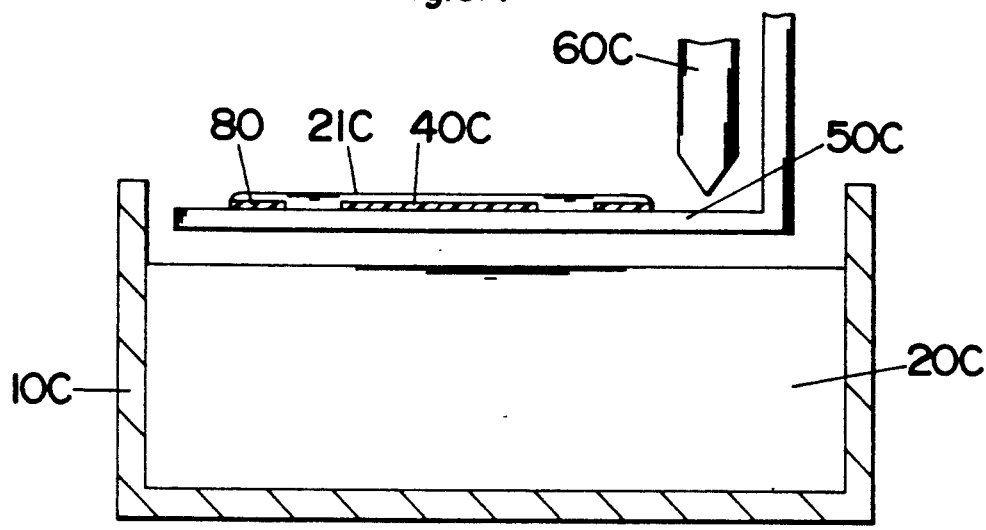
FIGS. 9A and 9B are schematic views illustrating the steps of forming a single stratum of the liquid resin in the fabrication process of FIG. 7.
Figure 9B:
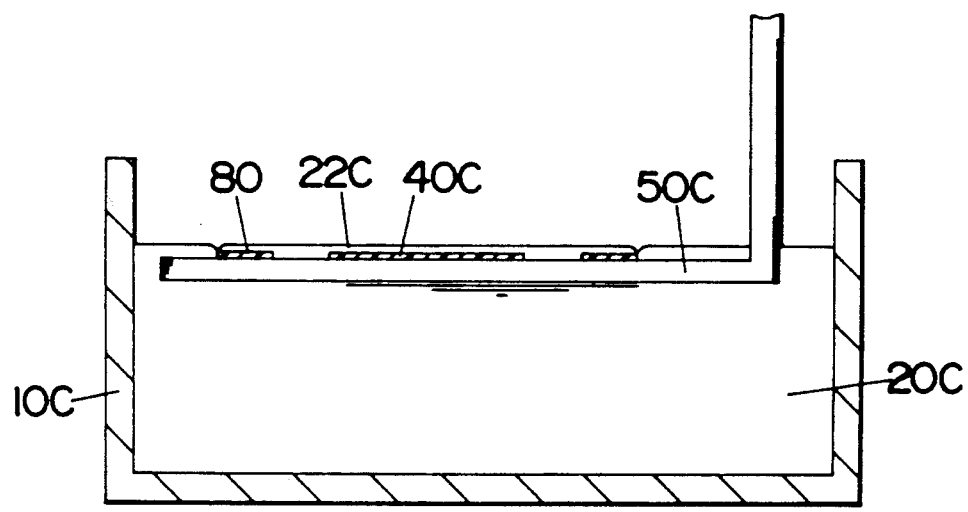
Figure 10:
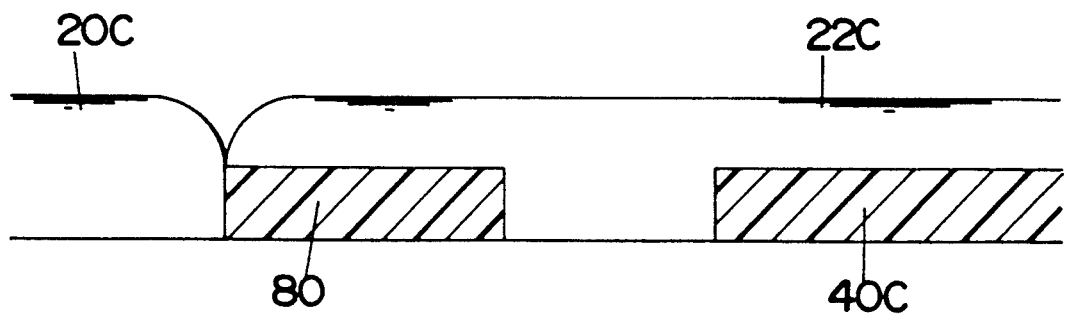
FIG. 10 is an enlarged sectional view illustrating a boundary between the periphery of the stratum and the surrounding liquid resin in correspondence to the condition of FIG. 9B.

A process in accordance with a fourth embodiment of the present invention will be discussed with reference to FIGS. 7 to 10. The process utilizes, in addition to a like vessel 10C containing a volume of liquid resin 20C and a like scraper 60C, a self-growing enclosure 80 which is formed at the same time of providing successive cross-sectional layers 40C in such a manner as to have its height incremented to surround the stack of the cross-sectional layers 40C. The enclosure 80 is formed on the platform 50C to have an equal thickness or height as that to the stack of the cross-sectional layers 40C and to have enough width or wall thickness. Thus formed enclosure 80 is cooperative with the cured layer 40C to define therebetween a space within which uncured liquid resin 20 remains. Each time the enclosure 80 is incremented and the cross-sectional layer 40 is formed on the platform 50C, they are immersed into the liquid resin 20C in the vessel 10C followed by being lifted above the liquid level to form a continuous coat 21C extending over from the preceding cured layer 40C to the top of the enclosure so. Then, the coat 21C is thinned over its entire area by the operation of the scraper 60C, as shown in FIG. 9A, into a corresponding stratum 22C having a thickness substantially equal to that of a subsequently formed cured layer 40C. Thereafter, the platform 50C is immersed into the liquid resin 20C to have a top surface of the stratum 22C in level with the liquid level of the liquid resin in the vessel 10C, as shown in FIG. 9B, in the like manner as in the first embodiment. At this condition, the stratum 22C is rounded only at the outer periphery of the enclosure 80, as best shown in FIG. 10, and therefore has a uniform thickness over a portion extending form the preceding cured layer 40C to at least the inner periphery of the enclosure 80. Therefore, it is possible to instantaneously cure the substantial portion of the stratum 220 on the preceding layer 40C into an additional cross-sectional layer 40C of precise configuration, whereby further expediting the formation of a three-dimensional object. The curing of the portion of the stratum 22C on the enclosure 80 or the self-glowing of the enclosure so can be made instantly without waiting the smoothening of the portion in cooperation with the surrounding liquid resin, since the enclosure 80 is only required to store the liquid inside thereof and is not necessarily formed into an accurate configuration. Nevertheless, since the smoothening of the periphery of the stratum 22C can be made in a short time, accurate formation of the enclosure 80 is still possible without causing substantial delay.

Referring to FIGS. 11A to 11D, there is shown a modified scheme for the step of smoothening a stratum 22 of the liquid resin within the vessel 10 in a more efficient manner which may be adapted to the above embodiments. In this scheme, after scraping a coat of the liquid resin into a correspondingly thinned stratum 22, the platform 50 is firstly lowered through a position of FIG. 11A in which the top surface of the stratum 22 is in level with the liquid level of the surrounding liquid resin 20 to a position of FIG. 11B in which the top surface of the stratum 22 is lowered from the liquid level by a short distance D. At this condition, the surrounding liquid resin 20 is hastened to flow toward the rounded periphery of the stratum 22 due to the level difference or fall between the surrounding liquid resin 20 and the stratum 22, thereby filling a gap around the periphery of the stratum 22 in a very short time, as shown in FIG. 11C. Immediately after or just before the condition of FIG. 11C is reached, the platform 50 is lifted to have the top surface of the stratum 22 in level with the surrounding liquid resin 20 so as to complete smoothening of the stratum 22 as well as give a desired thickness to the stratum 22, as shown in FIG. 11D. In this scheme, as the above level difference D increases, the filling of the gap can be made in shorter time. But, more time is required to lift the platform 50 from the position of FIG. 11C to the position of FIG. 11D with corresponding increase in time for averaging the liquid resin into the desired thickness. In consideration of the above, the level difference D is preferred to be twice the thickness of the stratum 22 for optimum efficiency.

Figure 13A:
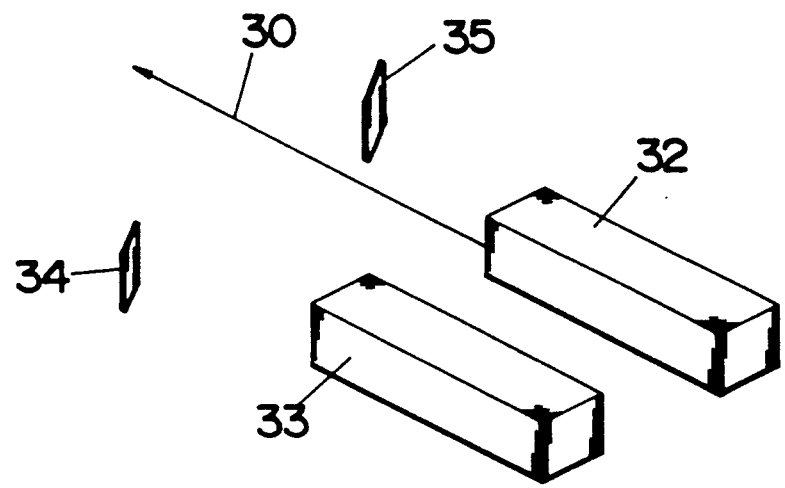
FIGS. 13A and 13B are schematic views illustrating an arrangement of a ultraviolet laser source and an infrared laser source for selectively emitting a corresponding laser beam to cure and heat the liquid resin, which may be utilized to effect the heating of the liquid resin in the modified scheme of FIGS. 12A to 12D.
Figure 13B:
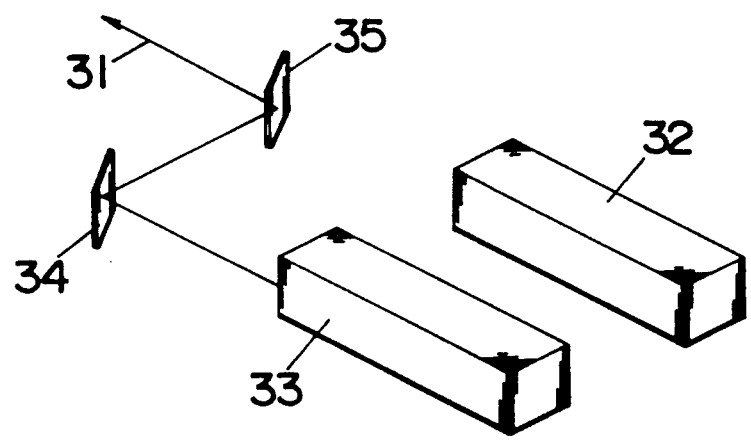

In order to more expedite the filling of the gap formed between the stratum 22 just immersed in the vessel and the surrounding liquid resin 20, it is preferred to apply heat to the boundary therebetween. For example, an infrared laser beam 31 is directed to boundary, as shown in FIGS. 12A and 12B. By the application of heat, the liquid resin 20 in the boundary becomes less viscous and correspondingly becomes more fluid so as to rapidly smoothen the liquid resin into the stratum 22 of a uniform thickness, as shown in FIG. 12C, after which the light curing ultraviolet laser beam 30 is scanned over the stratum 22 to cure it into a corresponding layer of a desired cross-sectional configuration, as shown in FIG. 12D. The switching of the UV laser beam 30 and the IR laser beam 31 is accomplished by an arrangement of FIGS. 13A and 13B which includes an UV laser source 32, an IR laser source 33, and a pair of reflectors 34 and 35. The reflectors 34 and 35 are movable in combination relative to the sources 32 and 33 between a curing position of FIG. 13A where they are offset from the path of the UV and IR laser beams 30 and a heating position of FIG. 13B where they comes into a beam directing relation to the IR laser beam 31 from the IR source 34. In the curing position, only the UV laser beam 30 is generated and directed to the stratum 22 of the liquid resin free from the reflectors 34 and 35 for curing it into a desired cross-sectional configuration. In the heating position, on the other hand, only the IR laser beam 31 is generated and directed as being reflected respectively on the reflectors 34 and 35 to the same point as the UV laser beam 30 would do. With this arrangement, the scanning and focusing of the UV and IR laser beams 30 and 31 can be effected by a common scanning device and does not require duplicated scanning and focusing devices.

Figure 14:
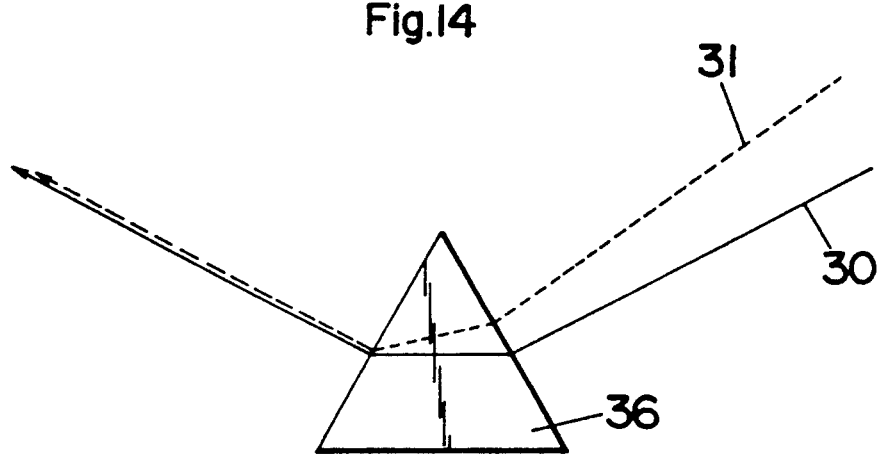
FIG. 14 is a schematic view illustrating a prism for selectively directing a ultraviolet laser beam and an infrared laser beam which may be utilized in the modified scheme of FIGS. 12A to 12D.

Alternately, the UV and IR laser beams 32 and 33 can be directed to a common scanning path by the use of a prism 36, as shown in FIG. 14. The UV and IR laser beams 32 and 33 are directed to the prism 36 at different angles of incident displaced by an angle of Θ. Due to the difference in refractive indexes of the UV and IR light, they can be directed outwardly of the prism 36 to a common point by directing the IR laser beam 31 at an incident angle greater than the UV laser beam 30 by an angle of Θ, as shown in the figure.

Figure 15A:
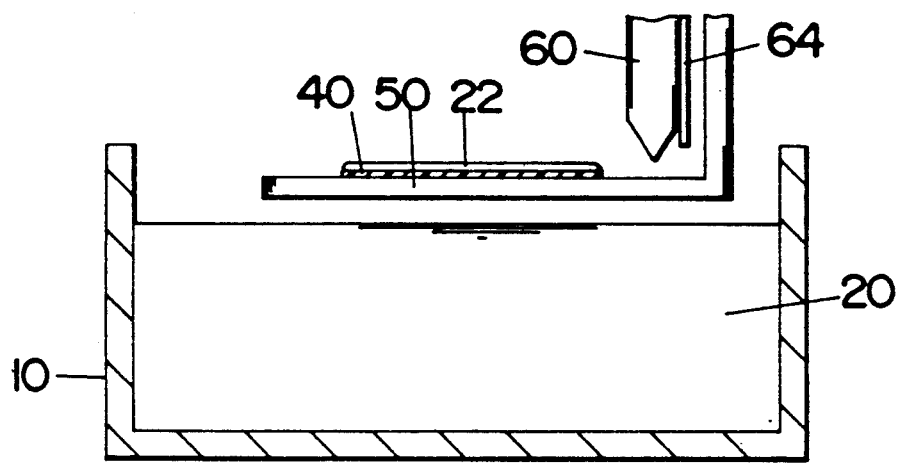
FIGS. 15A and 15B are schematic views illustrating a further scheme of forming a stratum of the liquid resin with the aid of another heater which may be adapted to the above fabrication processes.
Figure 15B:
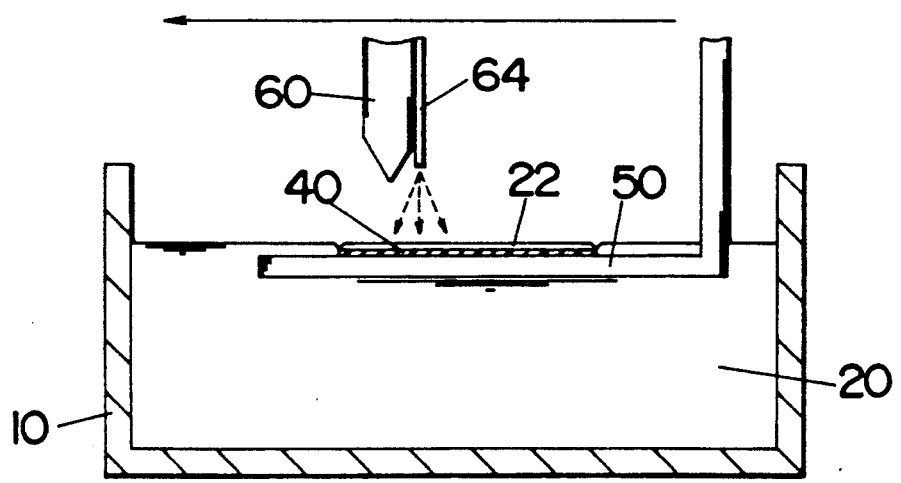
Figure 16A:
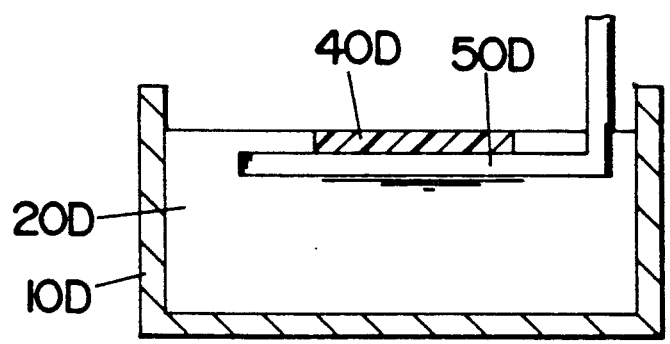
FIGS. 16A to 16C are schematic views illustrating a process of fabricating a three-dimensional object from a light curable liquid resin in sequence by the use of a vessel containing a volume of the liquid resin and a vertically movable platform in accordance with a fifth embodiment of the present invention.
Figure 16B:
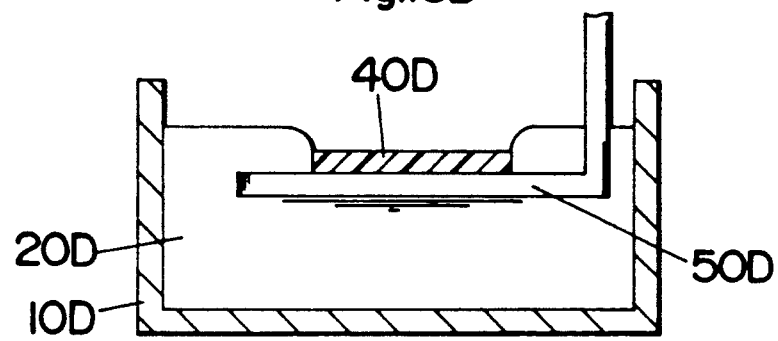
Figure 16C:
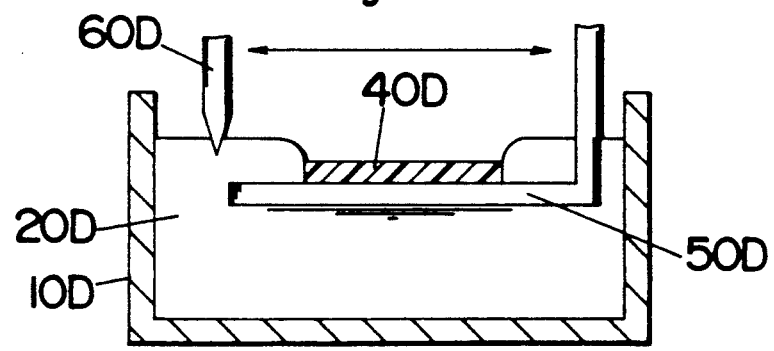
Figure 16D:
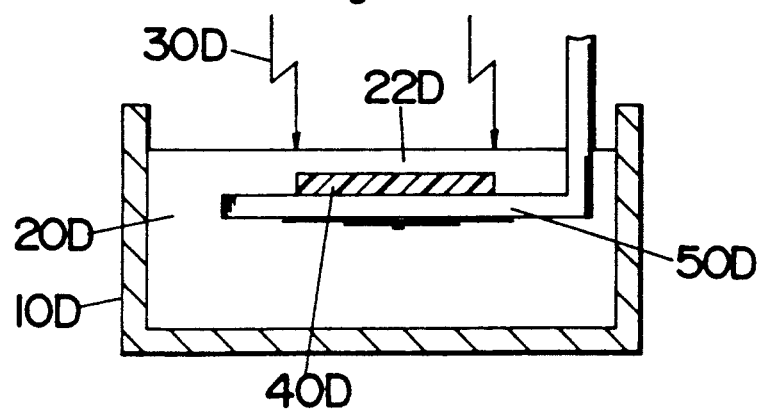

In order to facilitate the smoothening of the stratum 22 after immersing it into the liquid resin of the vessel 10 in any of the above embodiments, it is proposed to apply a hot air to reduce the viscosity of the stratum 22 and increase the fluidity. To this end, a blower 64 of generating a flow of the hot air may be attached to the scraper 60, as shown in FIGS. 15A and 15B, to be horizontally movable therewith for applying the hot air to the liquid resin 20, particularly at the boundary portion including the periphery of the stratum 22 and the adjacent portion of the surrounding liquid resin 20.

Fifth embodiment <FIGS. 16 and 17>

Figure 17A:
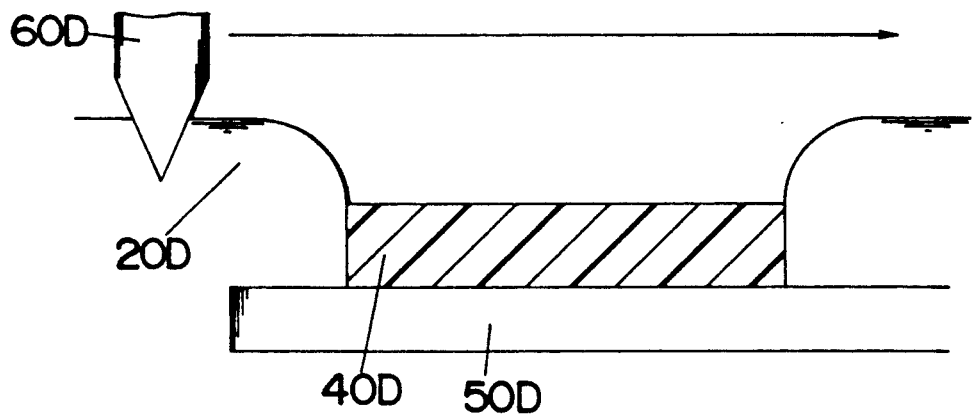
FIGS. 17A to 17C are enlarged views illustrating the flow of the liquid resin in sequence which may be effected in the steps of FIGS. 16C to FIG. 16D.
Figure 17B:
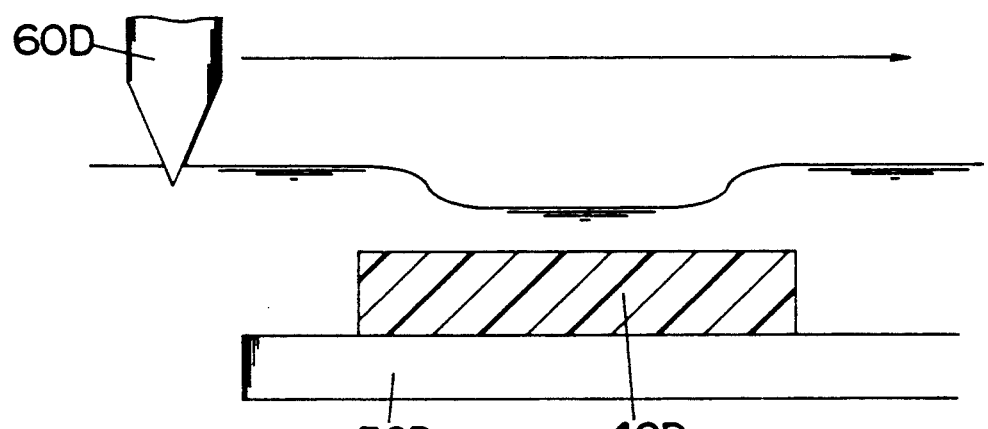
Figure 17C:
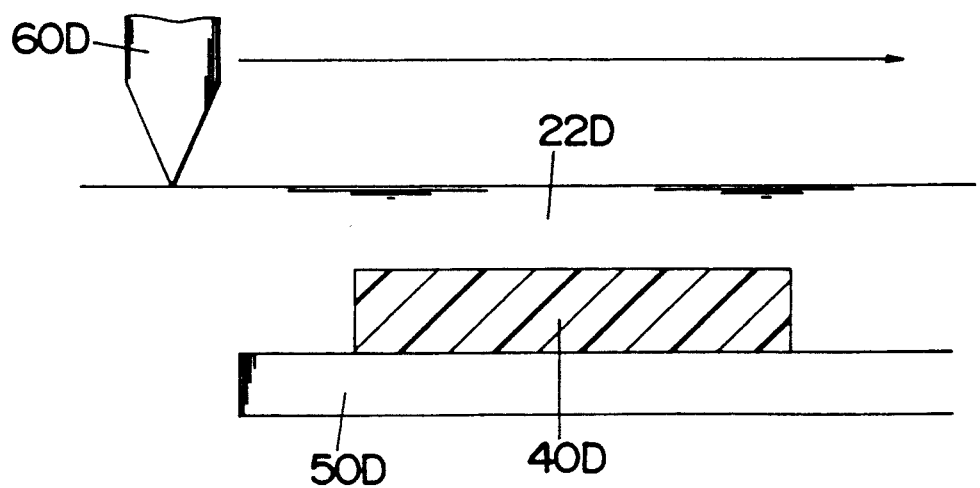

Referring to FIGS. 16 and 17, there is shown a process of forming a stratum 22D of the liquid resin in accordance with a fifth embodiment of the present invention. The process utilizes a like vessel 10D containing a volume of the liquid resin 20D with a vertically movable platform 50D and a doctor blade 60D capable of horizontally moving with its lower end immersed into the liquid resin 20D. After the cured layer 40D is formed on the platform 50D by exposure to the light while the platform 50D is immersed in the liquid resin 20D, as shown in FIG. 6A, the platform 50D is lowered to provide a fall between the liquid level of the surrounding liquid resin 20D and the top surface of the cured layer 40D, as shown in FIG. 16B. Immediately thereafter, the doctor blade 60D comes into operation to rake the surrounding liquid resin 20D onto the preceding cured layer 40D, as shown in FIG. 16C. Thus, a stratum 22D of the liquid resin is formed on the preceding cured layer 40D. Thereafter, the stratum 22D can be self-smoothened by the effect of the gravity and surface tension thereof followed by being cured by exposure to the light beam 30D into a desired cross-sectional configuration, as shown in FIG. 16D. In the step of gathering the liquid resin onto the preceding cured layer 40D, only a one horizontal stroke of the doctor blade 60D may be effective to form the stratum 22D. But, it is more effective to move the doctor blade 60D in more than two strokes successively, as shown in FIGS. 17A to 17C. At the first stage, the doctor blade 60D is set to have its lower end immediately adjacent to the top surface of the preceding cured layer 40D, as shown in FIG. 17A, so as to gather the surrounding liquid resin 20D roughly onto the preceding cured layer 22D. At this condition, the liquid resin gathered on the preceding cured layer 40D sees a concave in its top surface, as shown in FIG. 17B, which concave could be eliminated only after a rather extended period of time. Then, the doctor blade 60D is lifted to have its lower end immediately below the liquid level, as also shown in FIG. 17B, so as to supply an additional amount of the liquid resin into the concave, thereby enabling a rapid formation of the stratum 22D and facilitate to smoothing the stratum 22D, as shown in FIG. 17C.

Sixth Embodiment <FIGS. 18A to 18D>

FIGS. 18A to 18D illustrate an improved scheme of promoting the formation of a stratum 22E of the liquid resin on a preceding cured layer 40E in accordance with a sixth embodiment of the present invention. The scheme utilizes a vessel 10E containing a volume of the liquid resin 20E with a vertically movable platform 50E. After forming a cross-sectional layer 40E on the platform 50E in a manner as in the first embodiment or the like, as shown in FIG. 18A, the platform 50E is lowered deep into the vessel 10E followed by being lifted to a level where the top surface of the cured layer 40E is kept at a depth corresponding to the thickness of a nextly formed layer, at which condition the liquid resin supplied over the cured layer 40E is in the form of a bulged coat 21E, as shown in FIG. 18B. At this time, ultrasonic or like minute vibrations are applied to the liquid resin 20E, as schematically indicated by arrows in FIG. 18D, to enhance the fluid flow and therefore facilitate the formation a smoothened stratum 22E. Thereafter, a UV light beam 30E is scanned over the stratum 22E to cure it into a corresponding layer of a desired cross-sectional pattern, as shown in FIG. 18D. The vibrations of the liquid resin 20E is effected by a source of vibration which may be attached to the vessel 10E, to the platform 50E through a supporting structure thereof, or to both the vessel and the platform. It is noted in this connection that the application of the vibrations may start prior to lifting the platform 50E to a position of FIG. 18C. That is, the vibration may be applied while the platform 50E is lifted from a position as indicated by dotted lines in FIG. 18B to a position as indicated by solid lines in the figure.

FIGS. 19A to 19D illustrates a modified scheme of promoting the formation of a stratum 22F on a preceding cured layer 40F with an aid of like vibrations as effected in the scheme of FIGS. 18A to 18D. After forming a cured layer 40F on a platform 50F in the like manner, as shown in FIG. 19A, the platform 50F is lowered to a depth corresponding to a thickness of a nextly formed layer, as shown in FIG. 19B. At this position or prior to lowering of the platform 50F to this position, like ultrasonic or minute vibrations are applied to the liquid resin 20F in the like manner, as schematically indicated by arrows in FIG. 19C, to enhance the fluidity for facilitating to flow the surrounding liquid resin 20F on the preceding cured layer 40F and to form a smoothened stratum 22F of the liquid resin. Thereafter, the resulting stratum 22F is cured into a corresponding layer of a desired cross-sectional pattern by exposure to the UV light beam 30F, as shown in FIG. 19D. It should be noted here that the above scheme could be well combined into the process of the sixth embodiment described with reference to FIGS. 16 and 17 for further facilitating the formation of the smoothened stratum.

Figure 20:
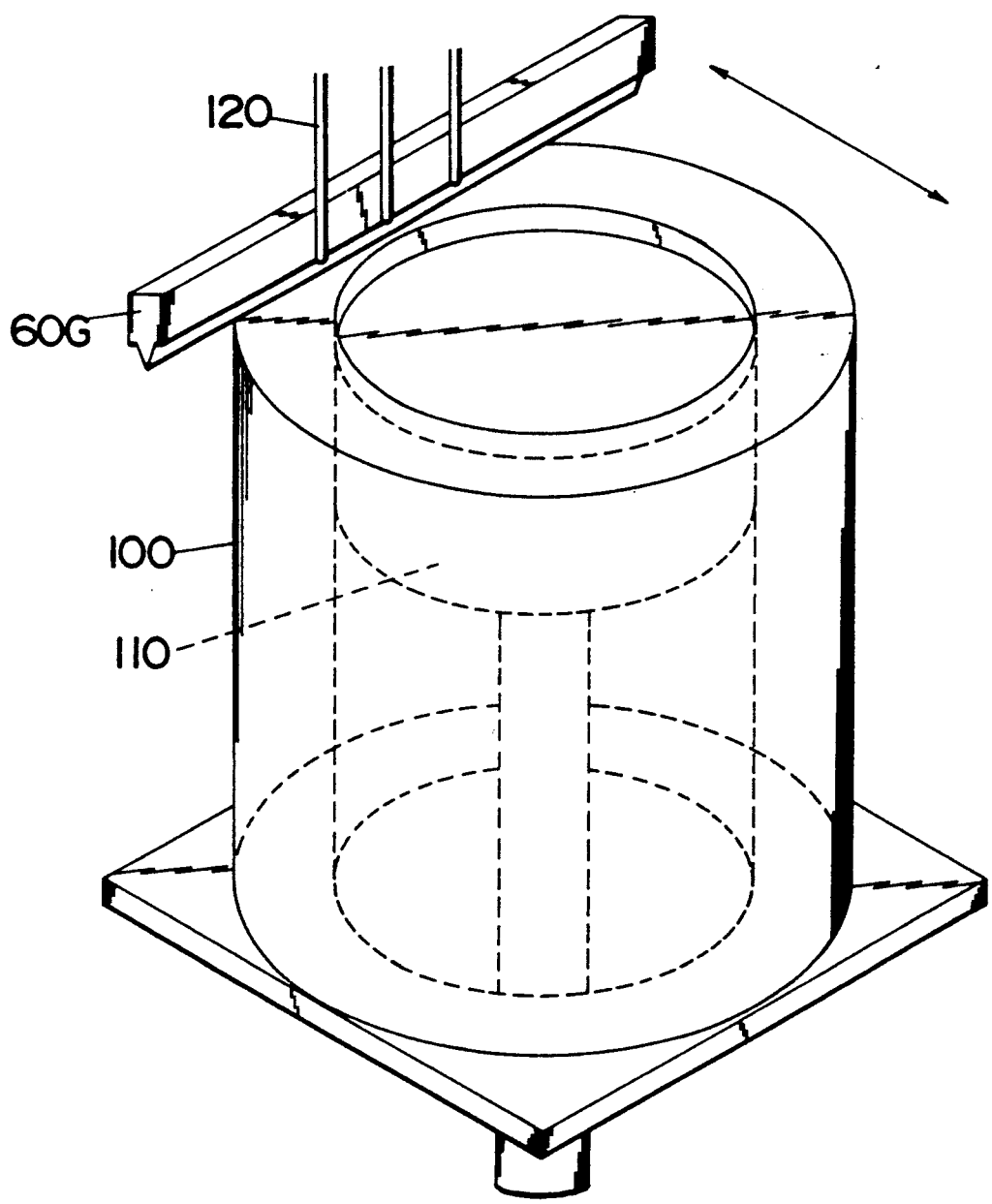
FIG. 20 is a perspective view of a device for fabricating a three-dimensional object from a light curable liquid resin in sequence by the use of a top-opened cylinder and a piston vertically movable therein in accordance with a seventh embodiment of the present invention.
Figure 21:
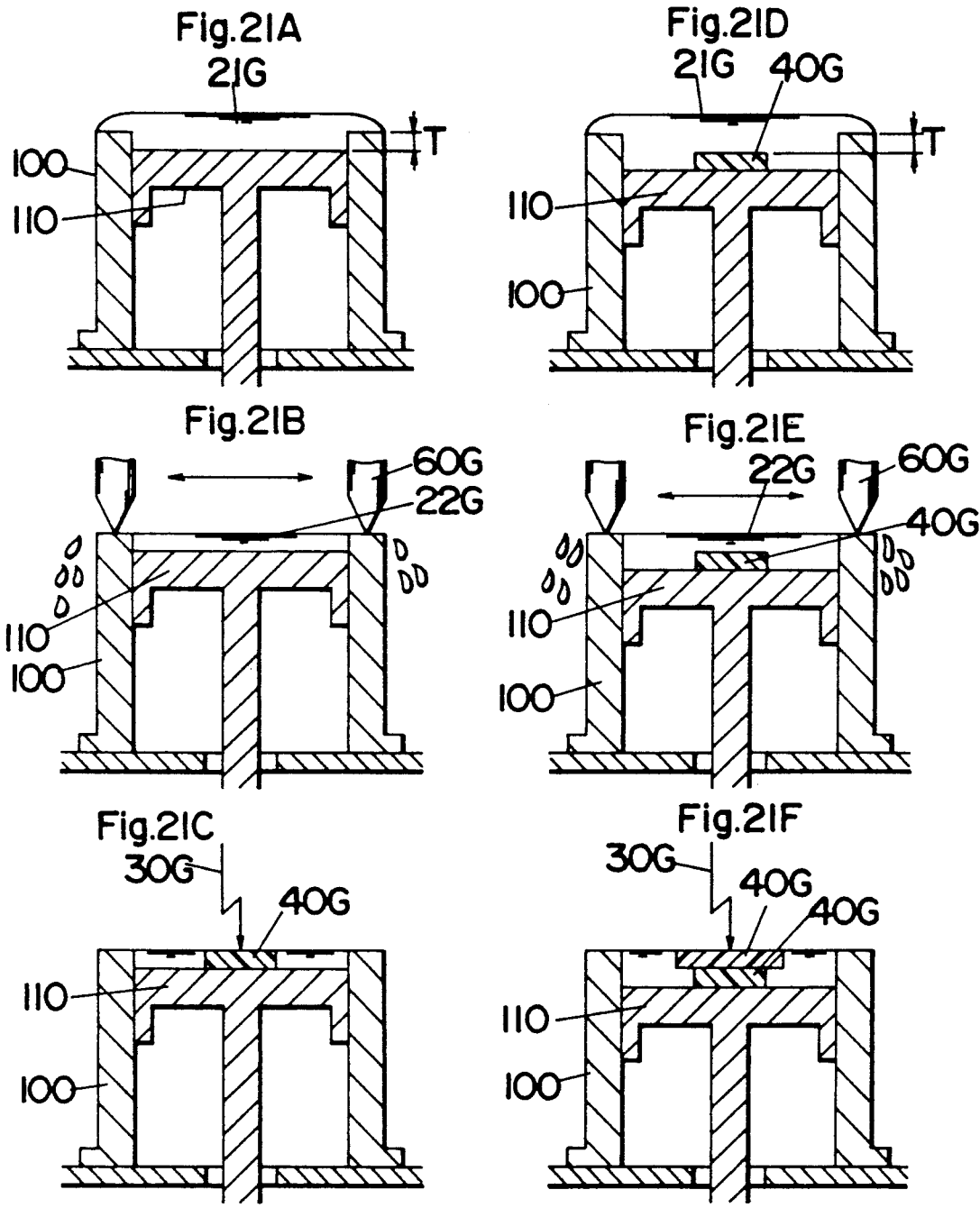
FIGS. 21A to 21F are schematic views illustrating a process of fabricating the three-dimensional object with the device of FIG. 20.

Seventh embodiment <FIGS. 20 to 21>

A process in accordance with a seventh embodiment utilizes a device which, as shown in FIG. 20, comprises a top-open cylinder 100, a piston 110 vertically movable within the cylinder 110, nozzles 120 located above the cylinder 100 to supply a suitable amount of like liquid resin onto and into the cylinder 100, and a doctor blade 60G horizontally movable in contact with a top flat surface of the cylinder 100. The piston 110 is formed to have a flat top surface in sealed contact at its periphery to the interior of the cylinder 100. At first, the piston 110 is set to have its top surface lowered by a distance T from the top face of the cylinder 100, after which the liquid resin is supplied from the nozzles 120 over the top face of the cylinder 100 and the piston 110 to form a coat 21G of the liquid resin, as shown in FIG. 21A. Then, the doctor blade 60G is operated to move horizontally with its lower end kept in level with the top end face of the cylinder 100 to scrape an excess amount of the liquid resin, thereby leaving a stratum 22G of the liquid resin on the piston 110, as shown in FIG. 21B. Thereafter, the resulting stratum 22G is scanned by the light beam 30G, as shown in FIG. 21C, to be cured into a corresponding layer 40G of a desired cross-sectional pattern. Subsequently, the piston 110 is lowered stepwise to locate the top surface of the preceding cured layer 40G lower than the top face of the cylinder 100 by a distance T corresponding to a nextly formed layer, as shown in FIG. 21D. Thereafter, like procedures are repeated to supply the liquid resin over the top surface of the piston 110 and the cylinder 110, scrape an excess amount of the liquid resin to form a fresh stratum, and to cure the stratum into a corresponding layer 40G by exposure to the light beam 30G, as shown in FIGS. 21E and 21F. These steps are repeated to successively form the cured layers and superimpose on each other for obtaining a three-dimensional object.

Figure 22:
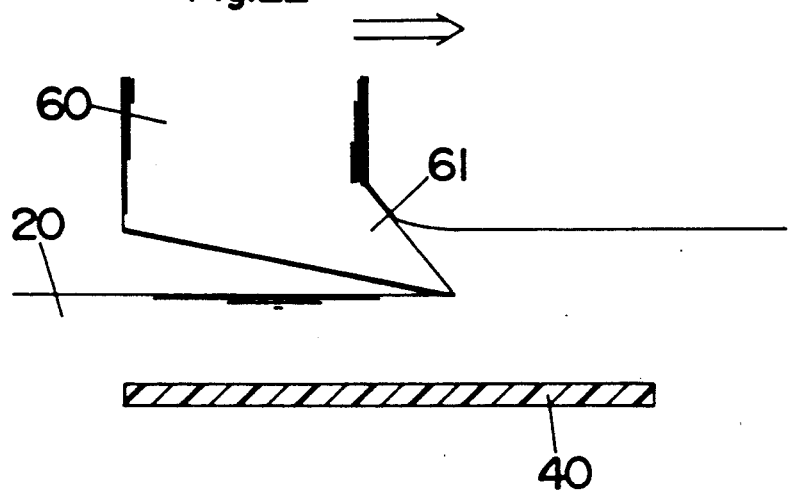
FIGS. 22 to 24 are schematic views respectively illustrating scrapers capable of scooping up the liquid resin.
Figure 23:
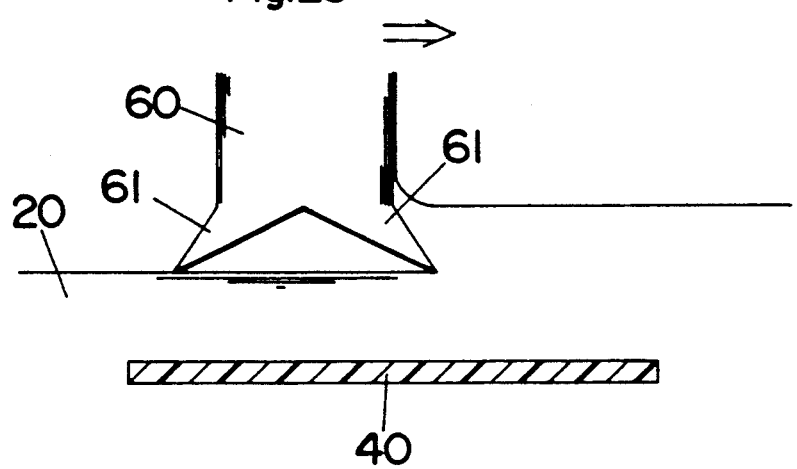
Figure 24:
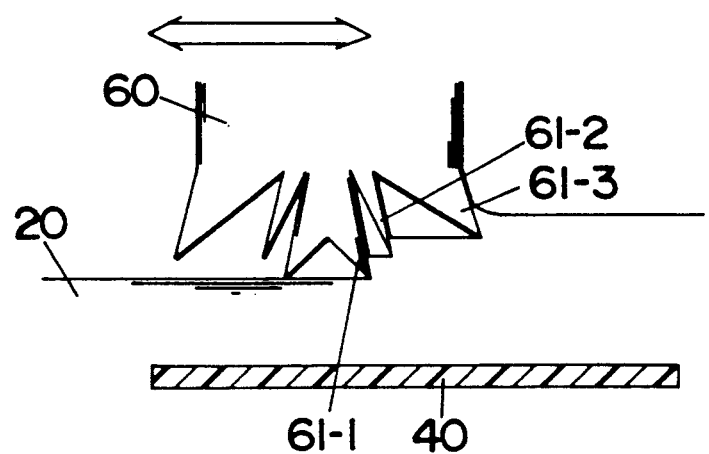
Figure 25:
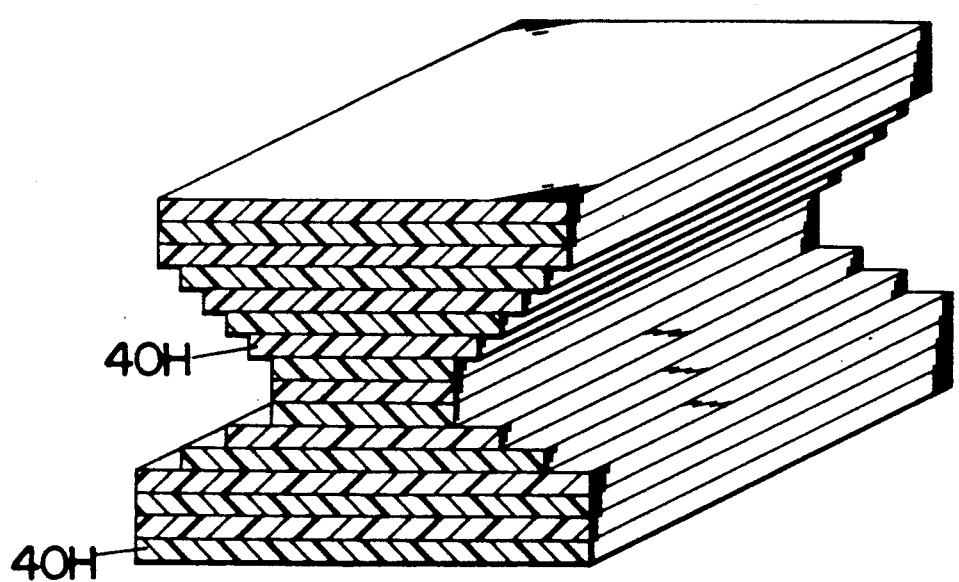
FIG. 25 is a perspective view illustrating a three-dimensional object fabricated in accordance with an eighth embodiment of the present invention.

As shown in FIG. 22, the scraper or doctor blade 60 that may be employed in the previous embodiments and modifications is preferred to have a scraping edge 61 so configured as to be capable of scooping up an extra portion of the liquid resin 20 while preventing a scooped liquid resin from substantially escaping past the edge 61 in a direction opposite to a moving direction of the scraper 60. With the provision of the scraping edge 61, the smoothening of the stratum is greatly enhanced to thereby improve the fabrication efficiency. Such scraping edge 61 may be formed on opposite sides of the scraper or the doctor blade 60, as shown in FIG. 23. This is particularly advantageous for the scraper of doctor blade which sweeps the liquid resin both in the forward and rearward stroke. Further, as shown in FIG. 24, the scraper or doctor blade 60 may be configured to have on either side thereof a set of the like scraping edges 61-1, 61-2, and 61-3 which are vertically spaced by $\Delta x1$ and $\Delta x2$, respectively. With this arrangement, the lower scraping edge 61-1 is made responsible for scraping only a small amount of the liquid resin while the upper scraping edges 61-2 and 61-3 scrape roughly a large amount of the liquid resin, thereby enabling a fine scraping or smoothening of the liquid resin even at a one stroke of moving the scraper or doctor blade.

Eighth Embodiment <FIGS. 25 to 31>

Figure 26A:
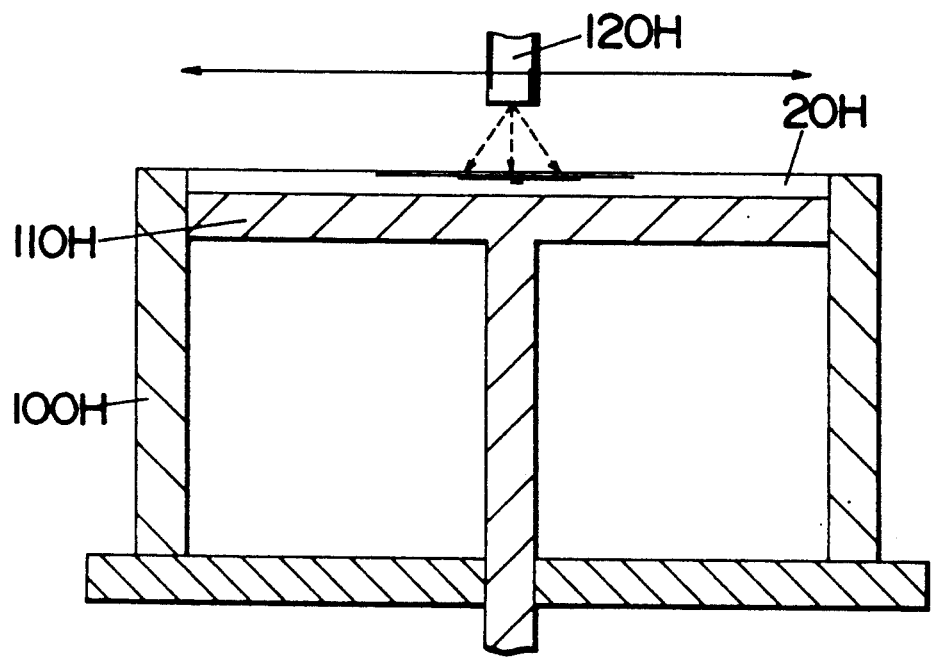
FIGS. 26A to 26C are schematic views illustrating the formation of a first layer constituting the three-dimensional object of FIG. 25.
Figure 26B:
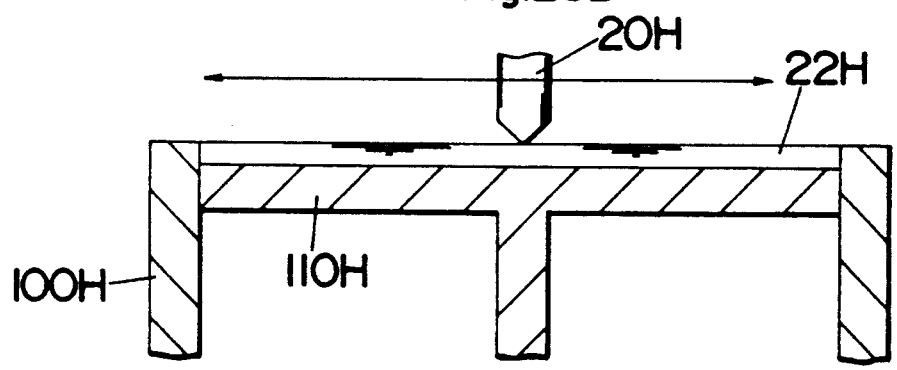
Figure 26C:
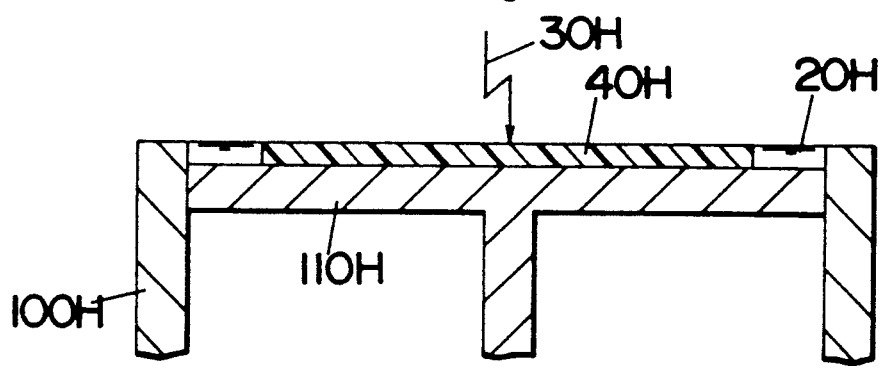
Figure 27A:
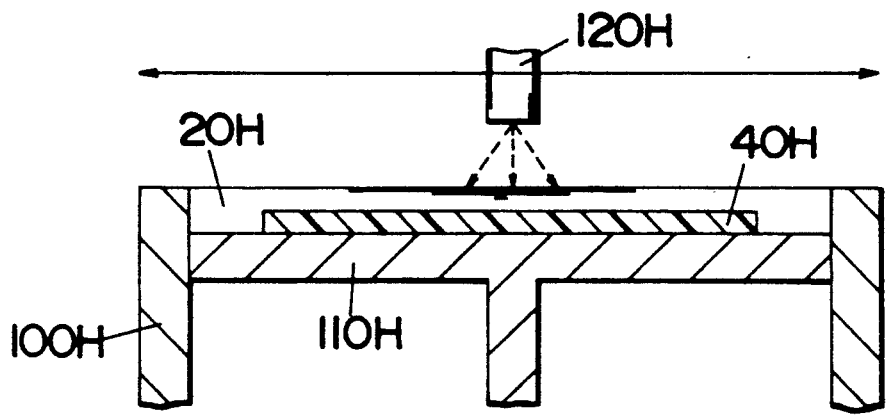
FIGS. 27A to 27C are schematic views illustrating the formation of a second layer constituting the three-dimensional object of FIG. 25.
Figure 27B:
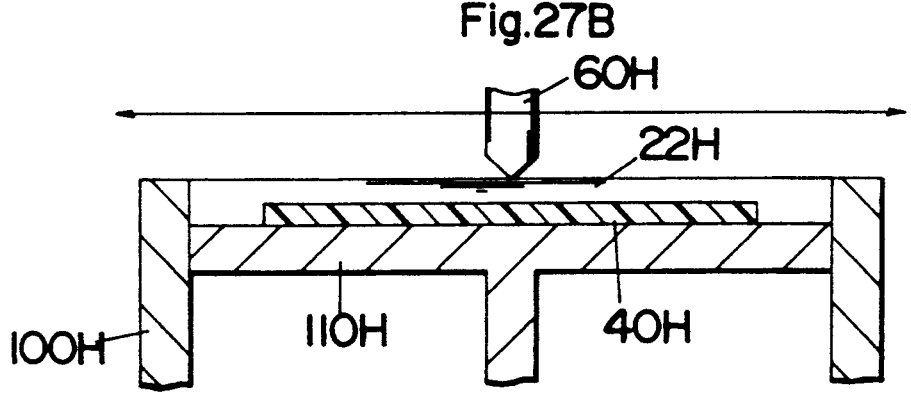
Figure 27C:
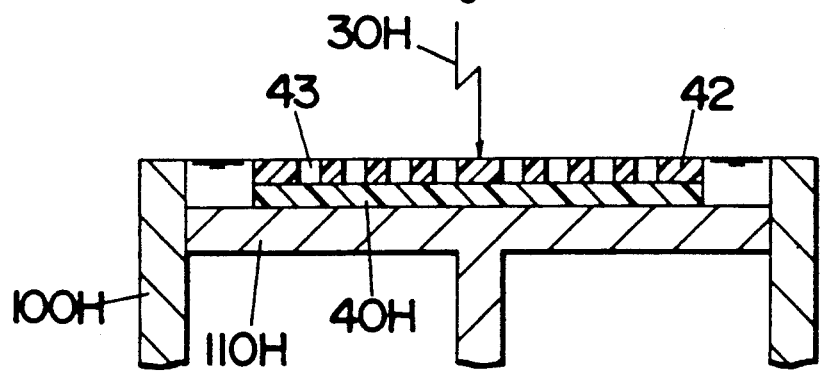
Figure 28:
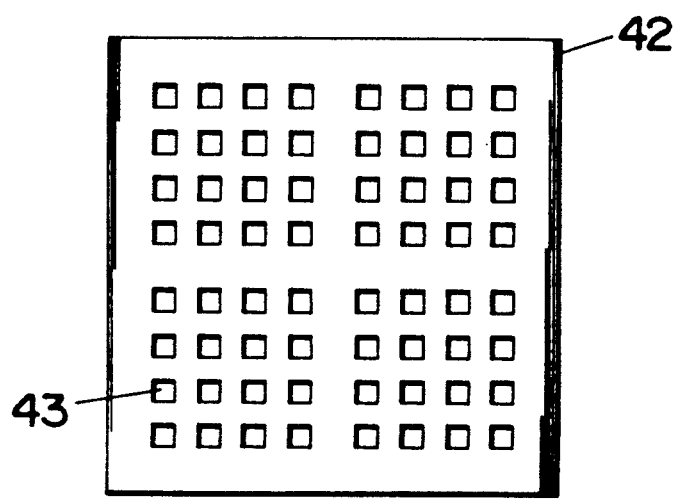
FIG. 28 is a plan view illustrating a lattice made of the cured resin in the second layer.
Figure 31:
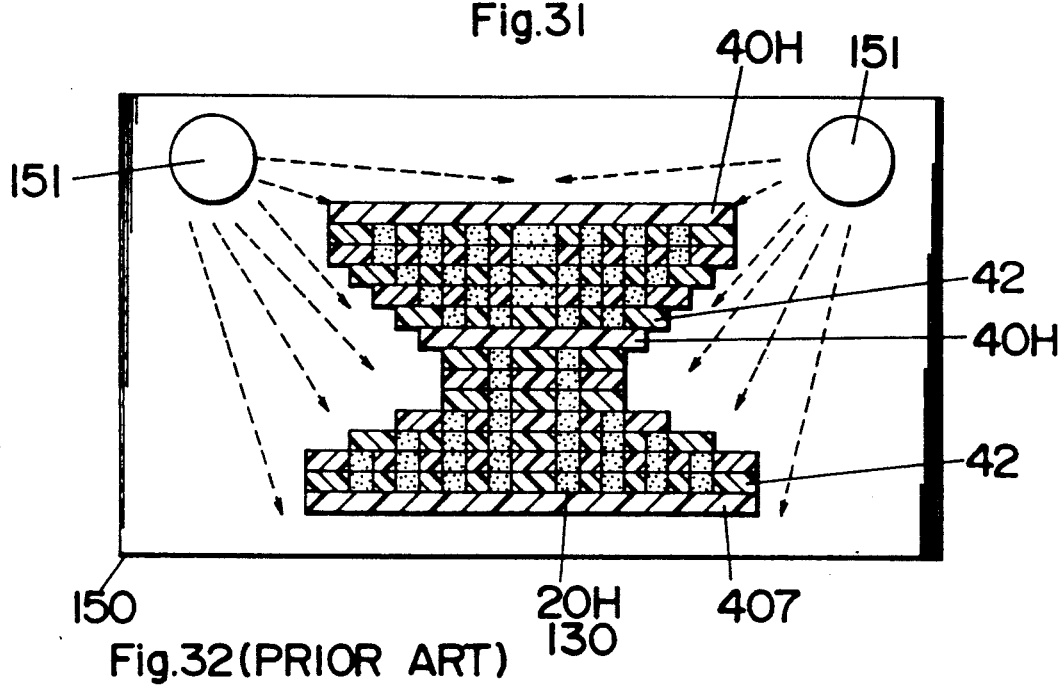
FIG. 31 is a vertical section of the three-dimensional object composed of the first and second layers and placed in a curing chamber.
Figure 32:
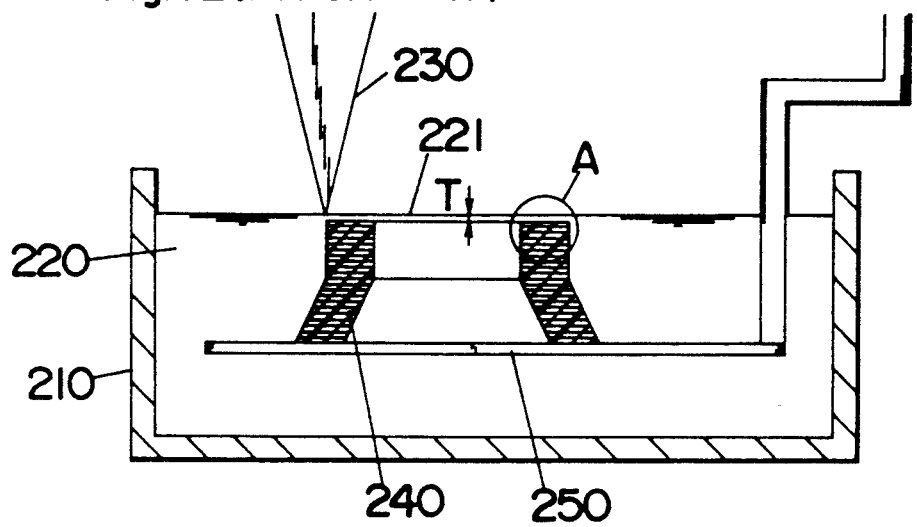
FIG. 32 is a vertical section illustrating a prior art process of fabricating a three-dimensional object.
Figure 33:
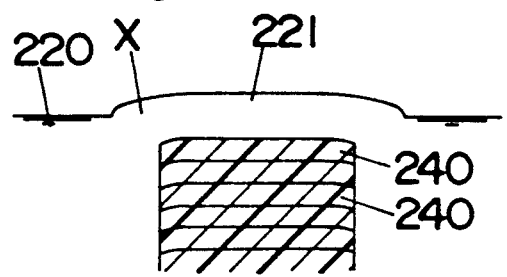
FIG. 33 is an enlarged view of a portion of A indicated in FIG. 32 for illustration of a problem occurring in the prior art process.

A process in accordance with an eighth embodiment of the present invention is characterized to incorporate a filler of less shrinkage into one or more of the cross-sectional layers constituting a three-dimensional object for more accurate fabrication thereof. The filler may be oxides such as alumina, glass, ceramics, metal or the like material and be prepared in the form of granules, particles, powder, or fibers. In the present embodiment, the filler is dispersed in the liquid resin forming the cross-sectional layers constituting other than the top and bottom of the three-dimensional object. The process is now discussed with reference to FIGS. 26 to 31 for fabrication of a three-dimensional object as exemplarily shown in FIG. 25. The process utilizes a like device as employed in the eighth embodiment and comprising a top-opened cylinder 100H, a piston 110, nozzles 120H, and a doctor blade 60H. As shown in FIGS. 26A to 26C, the liquid resin 20H is supplied from the nozzle 120H on the piston 110, and is then scraped into a corresponding stratum 22H by the doctor blade 60H followed by being cured into a corresponding cross-sectional layer 40H. Thereafter, another stratum 22H is formed on the preceding cured layer 40H by supplying the liquid resin from the nozzle 120H followed by being scraped by the doctor blade 60H, through the steps of FIGS. 27A and 27B. Then, scanning of the UV light beam 30H is made to selected areas of the resulting stratum 22H in such a manner as to partially cure the liquid resin and provide a lattice 42 of the cured resin, as shown in FIG. 27C and 28, and leave the liquid resin uncured at portions 43 confined between longitudinal and lateral segments of the lattice 42. Thereafter, another nozzle 121 moves horizontally over the lattice 42 to supply the filler 130 thereover, as shown in FIG. 29A. Within a short time, the filler 130 is allowed to sink into the uncured liquid resin at 43 in the lattice 42 and also around the preceding cured layer 40H and the lattice 42, while leaving an additional scum 131 of the filler 130 on the lattice 42 and the uncured liquid resin 20H. Then, the doctor blade 60H comes into operation to sweep the scum 131, as shown in FIG. 29B, leaving the uncured liquid resin of the lattice 42 dispersed with the filler 130. Thereafter, another stratum 22H is formed in the like manner on the previously formed lattice 42 followed by being partially cured by exposure to the light 30H into a corresponding lattice 42, through the steps of FIGS. 29C and 29D. The resulting lattice 42 is supplied with the filler 130 in the like manner to have the filler 130 dispersed in the uncured portions thereof. The above steps are repeated to form a stack of the lattices 42 between the bottom and top layers 40H of which substantial portions are already cured. One or more of the cured layers 40H like the bottom and top layers may be interposed at a suitable position within the stack of the lattice 42, as shown in FIG. 31. Such intermediate layers 40H are advantageous in that they block undue settlement of the fillers 130 over a plurality of the lattices 42. It should be noted here that, in order to block the settlement or transfer from the upper to the lower lattices 42, the adjacent lattices 42 are cured to have its cure portions in staggered relation to each other so that the uncured portions within the upper lattice 42 can be closed at their bottoms with the cured portions of the lower lattice 42, for example, as seen in the upper middle layers of the stack of FIG. 31. Finally, the resulting stack including the bottom and top layers 40H are placed in a chamber 150 and is exposed to ultraviolet lamps 151 to complete the curing of the liquid resin remaining within the lattices 42 while restraining the filler 130 therein. Although the stratum 22H of the liquid resin is shown to be formed by the use of the cylinder and the piston in this embodiment, they may be equally formed by the other device and process as disclosed in the other embodiments or modifications or even in the known fabrication method.

It should be noted that the feature of the above embodiments and modifications can be suitably combined in any manner so as to further improve the process of fabricating the three-dimensional object.

What is claimed is:

1. In a process of fabricating a three-dimensional object from a light curable liquid resin of viscous nature by radiating a light to a surface of said light curable liquid resin to have successive cross-sectional layers of the cured resin and superimposing said layers on each other, said process utilizing a vessel containing a volume of said light curable liquid resin and a platform capable of moving in and out of said liquid resin within said vessel for carrying thereon a stratum of said liquid resin which is to be subsequently cured by exposure to the radiation of said light into said cross-sectional cured layer, said platform or previously cured layer defining thereon an overlay surface with respect to the next superimposed cured layer, an improvement comprising the following steps of:
 a) forming said stratum of said liquid resin on said overlay surface of said platform or previously cured layer outside of said liquid resin within said vessel, the resulting stratum having a rounded periphery;
 b) immersing the resulting stratum into said liquid resin in said vessel to place a top surface of said stratum approximately in level with a liquid level within said vessel, thereby surrounding said rounded periphery of said stratum by the liquid resin in said vessel;
 c) allowing a portion of said liquid resin in the vicinity of said rounded periphery of said stratum to flow toward said rounded periphery in such a manner as to eliminate the rounded periphery and to give a continuous flush top surface to said stratum with a desired thickness extending over substantially the entire of said overlay surface; and
 d) radiating said light to said stratum so as to cure it into said cross sectional layer of the cured resin.

2. A process as set forth in claim 1, wherein said step a) comprises the following sub-steps of:
 immersing said platform into the volume of said liquid resin within said vessel in such a manner as to position said overlay surface of the platform or the previously formed cured layer to a depth which is greater than a desired thickness of said stratum to be subsequently cured;
 raising said platform to position said overlay surface above the liquid level of said vessel in order to carry a coat of said liquid resin on said overlay surface; and
 removing a top portion of the resulting coat of said liquid resin by means of a horizontally movable scraper to reform said coat into said stratum.

3. A process as set forth in claim 1, wherein said step a) comprises the following sub-steps of:
 supplying said liquid resin above and from other than the liquid resin in said vessel onto overlay surface of said platform or the previously formed cured layer to form thereon a coat of said liquid resin of which thickness is greater than a desired thickness of said stratum to be subsequently cured; and
 removing a top portion of the resulting coat of said liquid resin by means of a horizontally movable scraper to reform said coat into said stratum.

4. A process as set forth in claim 2, wherein said liquid resin adhered to said scraper at the time of removing the portion of said coat is cleaned off after effecting to remove the portion of said coat.

5. A process as set forth in claim 1, including to build up a top-open self-growing enclosure to surround the entire circumference of the preceding cured cross-sectional layer in a horizontally spaced relation thereto, said enclosure being formed commonly from said liquid resin to have its height increased by an increment of substantially the same thickness as that of said preceding cured layer such that a top end face of said enclosure is maintained at substantially the same horizontal level as a top surface of the preceding cured cross-sectional layer, and wherein said step a) comprises to supply said liquid resin over across said preceding cured cross-sectional layer, said enclosure and into a space defined therebetween to thereby leave said stratum of the liquid resin continuously extending horizontally from the top surface of said preceding cured layer to said top end face of said enclosure such that the resulting stratum of said liquid resin is of a uniform thickness over an area extending from the top of said preceding cured layer to at least an inner periphery of said top end face of said enclosure.

6. A process as set forth in claim 1, wherein said step b) comprises the following substeps of:
 lowering the top surface of said stratum on the platform or the preceding cured layer below the liquid level of said vessel and allowing the surrounding liquid resin to flow over said stratum to a certain extent; and
 raising said stratum to make the top surface thereof in level with the liquid level of said vessel.

7. A process as set forth in claim 1, wherein a boundary portion between said stratum and the surrounding liquid resin is heated while the stratum is in level with the liquid level of the vessel in order to expedite the flow of the liquid resin at said boundary portion.

8. In a process of fabricating a three-dimensional object from a light curable liquid resin of viscous nature by radiating a light to a surface of said light curable liquid resin to have successive cross-sectional layers of the cured resin and superimposing said layers on each other, said process utilizing a vessel containing a volume of said light curable liquid resin and a platform capable of moving in and out of said liquid resin within said vessel for carrying thereon a stratum of said liquid resin which is to be subsequently cured by exposure to the radiation of said light into said cross-sectional cured layer, said platform and previously cured layer defining thereon an overlay surface with respect to the next superimposed cured layer, an improvement comprising the following steps of:
 immersing said overlay surface of said platform or the previously formed cured layer into the volume of said liquid resin within said vessel to cause a level difference between said overlay surface and the liquid level of the surrounding liquid resin within said vessel;
 scraping said surrounding liquid resin to flow over said overlay surface by means of a horizontally movable scraper, thereby smoothing the liquid resin on said overlay surface and forming thereon a stratum of the liquid resin of a desired thickness; and
 radiating said light to said stratum so as to cure it into said cross sectional layer of the cured resin.

9. A process of fabricating a three-dimensional object from a light curable liquid resin of viscous nature by radiating a light to a surface of said light curable liquid resin to have successive cross-sectional layers of the cured resin and superimposing said layers on each other, said process utilizing a top-open vertically extending cylinder with a flat top end face and a piston vertically movable within said cylinder, said piston having a top surface on which said liquid resin is supplied to form thereon a stratum of the liquid resin which is to be subsequently cured by exposure to the radiation of said light into said cross-sectional cured layer, said top surface of said piston and previously cured layer on said top surface defining thereon an overlay surface with respect to the next superimposed cured layer, said process comprising the steps of:

moving said piston relative to said cylinder in order to position said overlay surface of said piston or the previously formed cured layer at a level lower than the top-open end of said cylinder;

supplying said liquid resin over a portion extending from said overlay surface to the flat top end face of said cylinder;

removing a portion of said liquid resin from the flat-top end face of said cylinder by means of a scraper which is horizontally movable in contact with the flat top end face of said cylinder, thereby forming said stratum on said overlay surface; and radiating said light to said stratum so as to cure it into said cross sectional layer of the cured resin.

10. In a process of fabricating a three-dimensional object from a light curable liquid resin of viscous nature by radiating a light to a surface of said light curable liquid resin to have successive cross-sectional layers of the cured resin and superimposing said layers on each other, said process utilizing a platform for carrying thereon a stratum of said liquid resin which is to be subsequently cured by exposure to the radiation of said light into said cross-sectional cured layer, said platform and previously cured layer defining thereon an overlay surface with respect to the next superimposed cured layer, said process comprising the steps of:

supplying said liquid resin on said overlay surface of said platform or the previously cured layer to form a coat of said liquid resin;

removing a top portion of said coat by moving a doctor blade horizontally in contact with said coat so as to form it into said stratum of said liquid resin of a desired thickness, said doctor blade configured to have a scraping edge which is capable of scooping up an extra portion of said liquid resin while preventing a scooped liquid resin from escaping past said scraping edge in a direction opposite to a direction of moving said doctor blade, and radiating said light to said stratum so as to cure it into said cross sectional layer of the cured resin.

11. A process as set forth in claim 10, wherein said doctor blade is configured to have on its opposite faces with said scraping edges, respectively.

12. A process as set forth in claim 11, wherein said doctor blade is formed on its opposite faced respectively with a vertically spaced set of said scraping edges.

13. In a process of fabricating a three-dimensional object from a light curable liquid resin of viscous nature by radiating a light to a surface of said light curable liquid resin to have successive cross-sectional layers of the cured resin and superimposing said layers on each other, said layers comprising first and second layers, said process comprising the steps of:

forming a first layer by curing substantially the entire portion of a corresponding stratum of said liquid resin;

forming a second layer by partially curing a corresponding stratum of said liquid resin in such a manner that the resulting second layer comprises a lattice of the cured resin and an uncured liquid resin retained within said lattice, and adding to said uncured liquid resin a filler of less shrinkage characteristic than said liquid resin;

removing an excess amount of said filler from the top surface of said second layer to smoothen said second layer;

building up said first and second layers into a desired three-dimensional configuration; and finally curing the first and second layers including said uncured liquid layer to obtain said three-dimensional object.

14. A process of fabricating a three-dimensional object from a light curable liquid resin of viscous nature by radiating a light to a surface of said light curable liquid resin to have successive cross-sectional layers of the cured resin and superimposing said layers on each other, said process utilizing a platform for carrying thereon a stratum of said liquid resin which is to be subsequently cured by exposure to the radiation of said light into said cross-sectional cured layer, said process comprising applying ultrasonic or minute vibrations to said liquid resin when forming said stratum therefrom.

* * * * *